(12) United States Patent
Matsuoka et al.

(10) Patent No.: US 6,254,370 B1
(45) Date of Patent: Jul. 3, 2001

(54) FORM FOR MANUFACTURING RESIN MOLD AND CLAMPING JIG FOR RESIN MOLD

(75) Inventors: Yasuhiko Matsuoka, Kanagawa; Tarou Kita, Tokyo, both of (JP)

(73) Assignee: Shonan Design Co., Ltd., Kanagawa (JP)

(*) Notice: Subject to any disclaimer, the term of this patent is extended or adjusted under 35 U.S.C. 154(b) by 0 days.

(21) Appl. No.: 08/928,499

(22) Filed: Sep. 12, 1997

(30) Foreign Application Priority Data

Jan. 31, 1997 (JP) .................................................. 9-000745
Aug. 5, 1997 (JP) .................................................. 9-210583

(51) Int. Cl.$^7$ .................................................. B29C 33/06
(52) U.S. Cl. ...................... 425/175; 425/174.4; 425/179; 425/470; 425/472; 425/DIG. 29; 249/117; 249/160; 249/163; 156/272.2
(58) Field of Search ...................... 425/175–180, 425/174.4, 470, 472, 179, DIG. 29; 249/117, 160, 163, 54; 264/478, 494, 496; 156/272.2

(56) References Cited

U.S. PATENT DOCUMENTS

| 4,824,628 | 4/1989 | Curfman | ..................... 33/38 |
|---|---|---|---|
| 5,011,633 | * 4/1991 | Neefe | ..................... 264/1.1 |
| 5,039,469 | 8/1991 | Martell et al. | ..................... 264/225 |
| 5,885,514 | * 3/1999 | Tensor | ..................... 264/478 |

FOREIGN PATENT DOCUMENTS

| 446040A1 | * 9/1991 | (EP) . |
|---|---|---|
| 0 832 726 A2 | 4/1998 | (EP) . |
| 58-122813 | 7/1983 | (JP) . |
| 3-11471 | 1/1991 | (JP) . |
| 3-114711 | 5/1991 | (JP) . |
| 4-018313 | 1/1992 | (JP) . |

* cited by examiner

Primary Examiner—Mathieu D. Vargdt
Assistant Examiner—Suzanne E. McDowell
(74) Attorney, Agent, or Firm—Paul A. Guss

(57) ABSTRACT

A form for manufacturing a resin mold has a frame housing a master model corresponding in shape to a product to be molded and having a space defined therein for receiving the ultraviolet-curable resin poured therein around the master model. The frame is made of an ultraviolet-permeable material. When ultraviolet radiation is applied outside of the frame to the frame, the ultraviolet-curable resin in the frame is cured into a resin mold. The resin mold can easily and quickly be manufactured. The resin mold can also reliably be clamped by a clamping jig for producing a high-quality molded product.

16 Claims, 20 Drawing Sheets

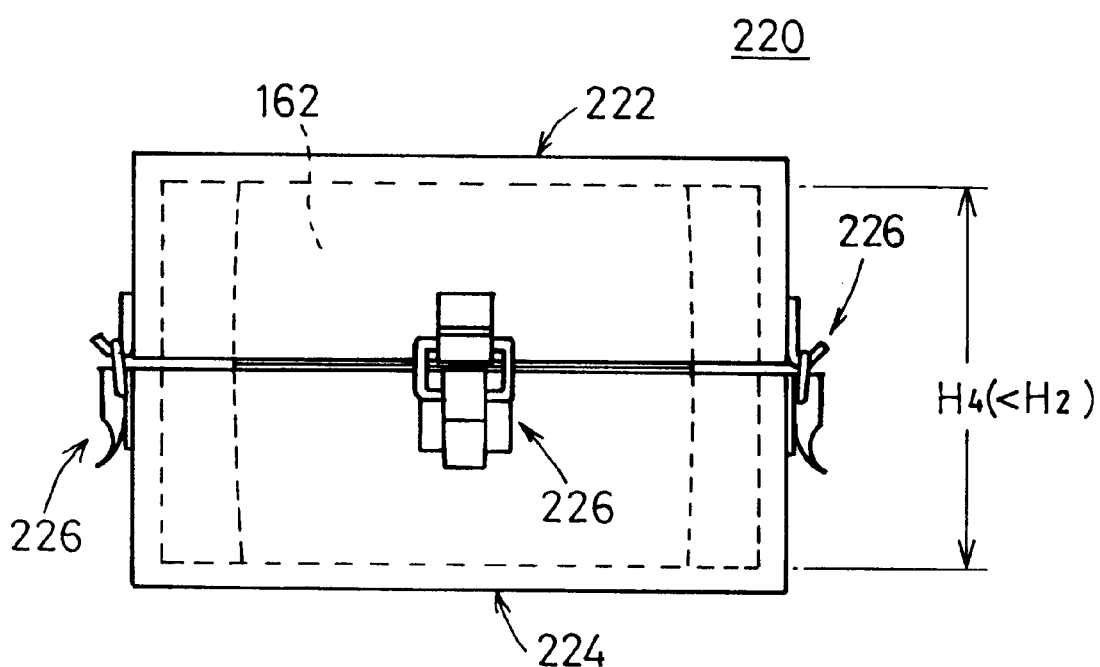
F I G. 15

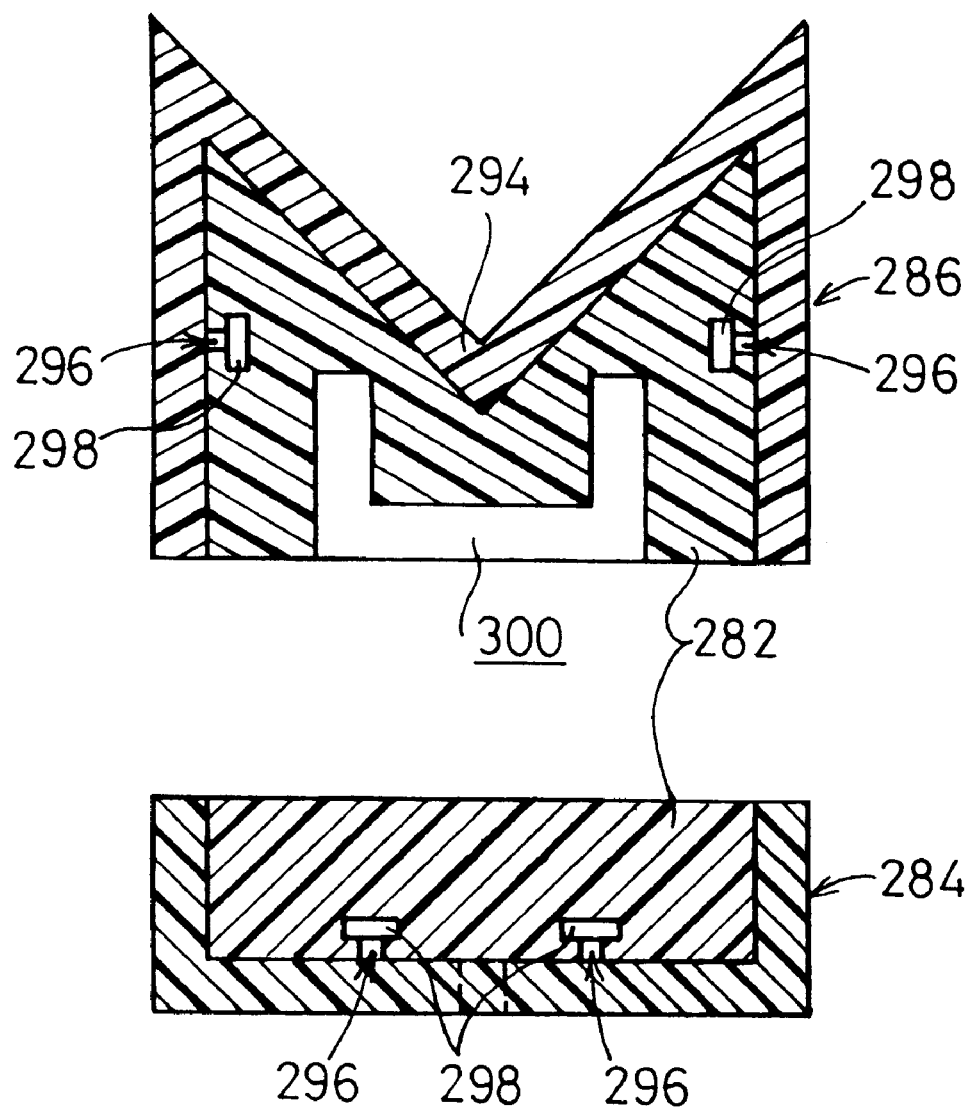

FORM FOR MANUFACTURING RESIN MOLD AND CLAMPING JIG FOR RESIN MOLD

BACKGROUND OF THE INVENTION

1. Field of the Invention

The present invention relates to a form for manufacturing a resin mold for molding an ultraviolet-curable resin which is poured therein by exposure to ultraviolet radiation, and a clamping jig for clamping such a resin mold.

2. Description of the Related Art

Generally, product development projects include a stage for manufacturing replicas of a new product for the purpose of making various appraisals of its qualities such as appearances, etc. One well known process of producing replicas is a vacuum casting method which employs a matrix of silicone rubber. According to this method, a master model as a pattern for producing replicas is formed, and then embedded in a thermosetting liquid silicone rubber compound. Then, after the thermosetting liquid silicone rubber compound is vulcanized, the master model is removed, and a thermosetting resin is poured into the mold cavity that has been created in the thermosetting liquid silicone rubber compound. The poured thermosetting resin is cured with heat, producing a replica.

To meet demands for forming replicas quickly, there has been proposed a process of producing replicas as disclosed in Japanese laid-open patent publication No. 3-11471, for example. The disclosed process employs a mold made of a transparent RTV (room-temperature-vulcanizable) silicone rubber compound. An ultraviolet-curable liquid resin such as an epoxy resin or an acrylic reactive resin is poured into the mold, and then cured into a replica by exposure to ultraviolet radiation.

The conventional process disclosed in the above publication is disadvantageous in that it is considerably time-consuming to produce the molded replica, and hence fails to satisfy user's demands for a quick overall period required from the designing of a master model until appraisals of the replica.

The applicant has proposed a process of simply and quickly producing a replica by generating a master model, forming a matrix of silicone rubber based on the master model, and pouring a resin into the matrix, as disclosed in Japanese patent application No. 8-274068.

According to the above proposed process, a matrix having a cavity complementary in shape to a replica to be formed is constructed of a vulcanized body of transparent photo-setting liquid silicon rubber compound, and a photo-setting liquid resin is poured into the cavity in the matrix. Light emitted from a light source outside of the matrix is applied to the photo-setting liquid resin through the matrix for thereby curing the photo-setting liquid resin into a replica.

SUMMARY OF THE INVENTION

It is a general object of the present invention to provide a form for manufacturing a resin mold easily and quickly.

A major object of the present invention is to provide a clamping jig for reliably clamping a resin mold to produce a high-quality molded product.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15 is a side elevational view of the clamping jig shown in FIG. 14;

FIG. 21 is an exploded vertical cross-sectional view of a resin mold manufactured by the form shown in FIG. 19.

DETAILED DESCRIPTION OF THE PREFERRED EMBODIMENTS

Figure 1:
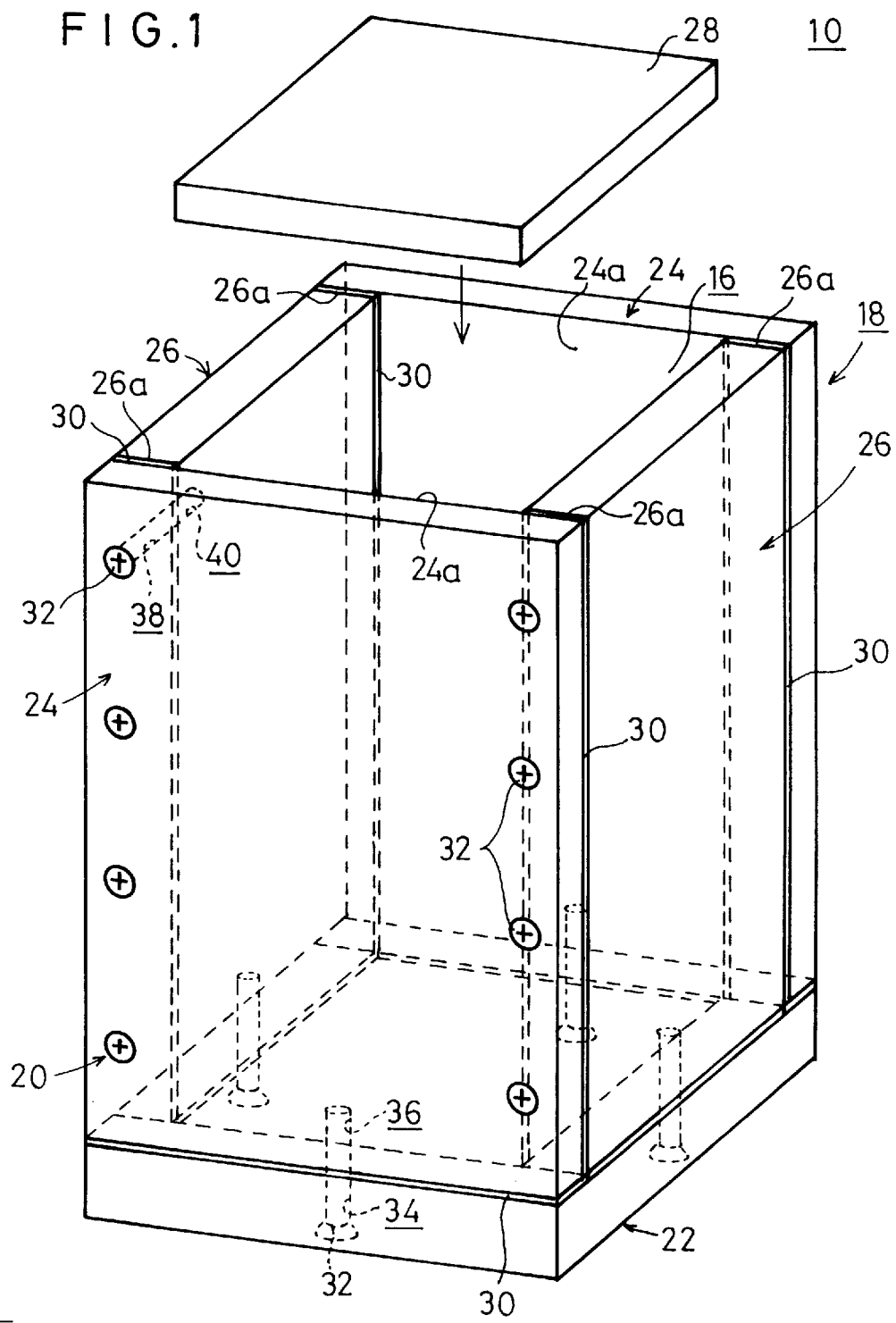
FIG. 1 is a perspective view of a form for manufacturing a resin mold according to a first embodiment of the present invention.
Figure 2:
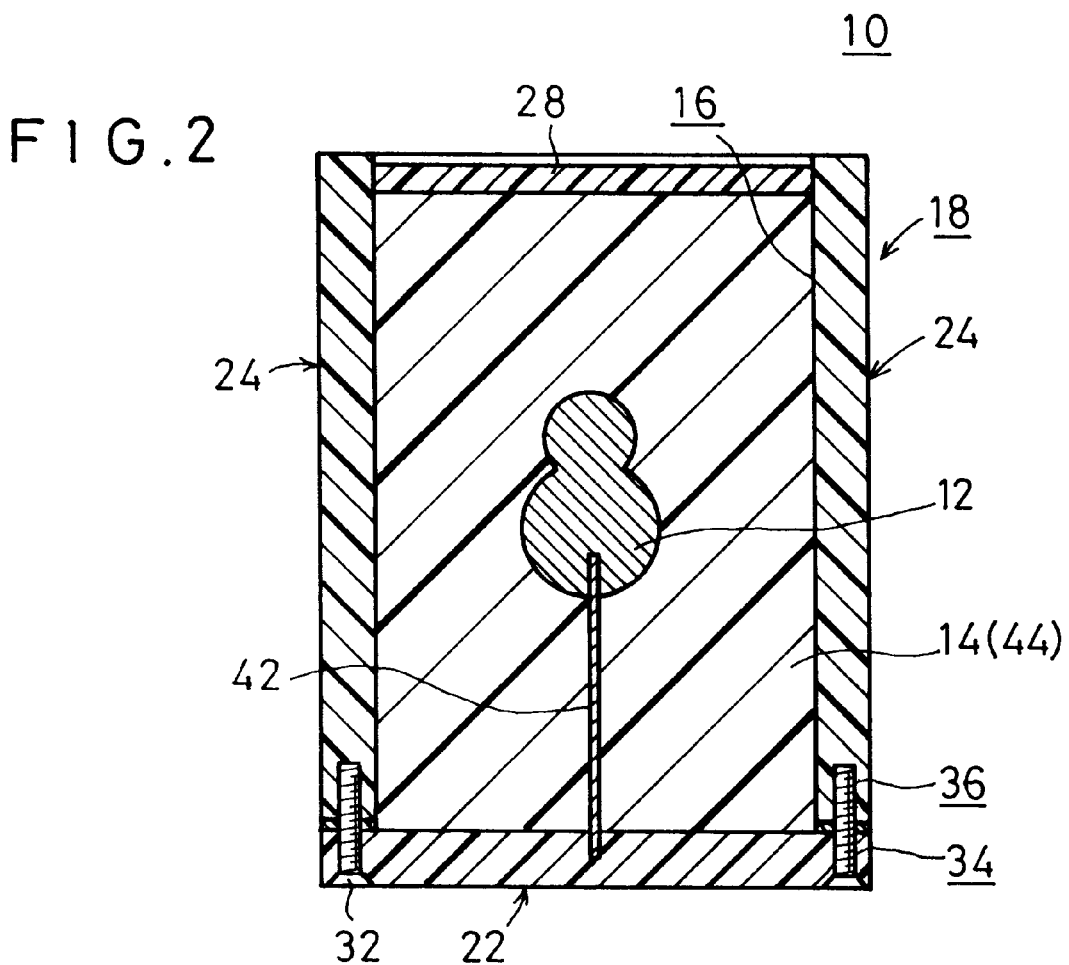
FIG. 2 is a vertical cross-sectional view of the form shown in FIG. 1.

As shown in FIGS. 1 and 2, a form 10 for manufacturing a resin mold according to a first embodiment of the present invention comprises a frame 18 defining a space 16 for accommodating a master model 12 that corresponds in shape to a product (not shown) to be molded and for receiving an ultraviolet-curable resin 14 to be poured in surrounding relation to the master model 12, and a plurality of fasteners 20 repeatedly usable for fastening the frame 18 integrally in a unitary structure.

The frame 18 comprises a bottom plate 22, a pair of parallel spaced first side plates 24 vertically disposed on the bottom plate 22 and serving as side walls, a pair of parallel spaced second side plates 26 vertically disposed on the bottom plate 22 and serving as side walls lying perpendicularly to the side walls provided by the first side plates 24, and a lid plate 28 insertable in the space 16 at an end of the frame 18 remote from the bottom plate 22. The bottom plate 22, the first side plates 24, the second side plates 26, and the lid plate 28 are made of an ultraviolet-permeable material such as an ultraviolet-permeable resin, an ultraviolet-permeable glass, or the like. In the first embodiment, each of the bottom plate 22, the first side plates 24, the second side plates 26, and the lid plate 28 comprises a transparent plate of acrylic resin which is permeable to ultraviolet radiation in a wavelength range from 200 to 500 nm.

The bottom plate 22 has an upper surface joined to lower ends of the first and second side plates 24, 26 by an ultraviolet-permeable transparent adhesive tape 30. The first side plates 24 have respective inner surfaces 24a joined to opposite end surfaces 26a of the second side plates 24 by an ultraviolet-permeable transparent adhesive tape 30. These ultraviolet-permeable transparent adhesive tapes 30 may have single-or double-sided adhesive layers.

The fasteners 20 comprise repeatedly usable bolts 32 by which the bottom plate 22 and the first and second side plates 24, 26 are fixed to each other and the first and second side plates 24, 26 are fixed to each other. The bottom plate 22 has through holes 34 defined substantially centrally in respective four side edges thereof, and the first and second side plates 24, 26 have threaded holes 36 of predetermined depth defined substantially centrally in respective lower ends thereof coxially with the respective through holes 34. The bolts 32 are inserted through the respective through holes 34 and threaded into the respective threaded holes 36, thereby fastening the lower ends of the first and second side plates 24, 26 to the bottom plate 22.

Each of the first side plates 24 has an array of vertically spaced through holes 38 defined in each of opposite vertical edges thereof, and each of the second side plates 26 has an array of vertically spaced threaded holes 40 of predetermined depth defined in each of opposite vertical ends thereof coxially with the respective through holes 38. The bolts 32 are inserted through the respective through holes 38 and threaded into the respective threaded holes 40, thereby fastening the first and second side plates 24, 26 to each other. The bottom plate 22 and the first and second side plates 24, 26 are thus fastened together into the frame 18 which is of a box shape.

The form 10 operates as follows:

As shown in FIG. 2, the master model 12 is placed in the space 16 in the frame 18 by a support 42 extending upwardly from the bottom plate 22. The ultraviolet-curable resin 14, e.g., ultraviolet-vulcanizable silicone rubber, is poured into the frame 18 by a vacuum casting method, after which the lid plate 28 is placed in the space 16 over the ultraviolet-curable resin 14.

Then, ultraviolet radiation from ultraviolet florescent lamps (not shown) placed upward, downward, left, right, forward, and backward of the form 10 is applied to the form 10 for a predetermined period of time. The ultraviolet radiation passes through the bottom plate 22, the first and second side plates 24, 26, and the lid plate 28 and irradiates the ultraviolet-curable resin 14 in the space 16, thereby curing the ultraviolet-curable resin 14 into a resin mold 44.

After ultraviolet radiation is applied to cure the ultraviolet-curable resin 14, the bolts 32 are removed to separate the bottom plate 22 and the first and second side plates 24, 26 from each other, and the lid plate 28 is detached. Then, the resin mold 44 is removed from the space 16. The resin mold 44 is thereafter split into two members, for example, and the master model 12 is removed. The resin mold 44 thus formed serves as a matrix having a molding cavity (not shown) which is complementary in shape to the master model 12.

In the first embodiment, the bottom plate 22, the first side plates 24, the second side plates 26, and the lid plate 28 are made of an ultraviolet-permeable material. After the space 16 in the frame 18 is filled with the ultraviolet-curable resin 14 which surrounds the master model 12, ultraviolet radiation is applied from around the frame 18 to the ultraviolet-curable resin 14 to cure the ultraviolet-curable resin 14 into the resin mold 44.

Consequently, it is possible to manufacture the resin mold 44 quickly with ease. The resin mold 44 can be formed with a much shorter period of time than a conventional matrix or resin mold made of thermosetting or room-temperature-vulcanizable silicone rubber.

According to the. present invention, furthermore, the bottom plate 22, the first side plates 24, and the second side plates 26 are fastened together by the repeatedly usable bolts 32 as the fasteners 20. Since the bolts 32 can repeatedly be used to assemble frames 18, they make the form 10 economical.

The bottom plate 22 and the first and second side plates 24, 26 are joined to each other by the transparent adhesive tape 30, and the first and second side plates 24, 26 are joined to each other by the transparent adhesive tape 30. These transparent adhesive tapes 30 serve as cushioning members that hold the first and second side plates 24, 26 intimately against each other for reliably preventing the ultraviolet-curable resin 14 poured in the space 16 from leaking out of the frame 18.

Figure 3:
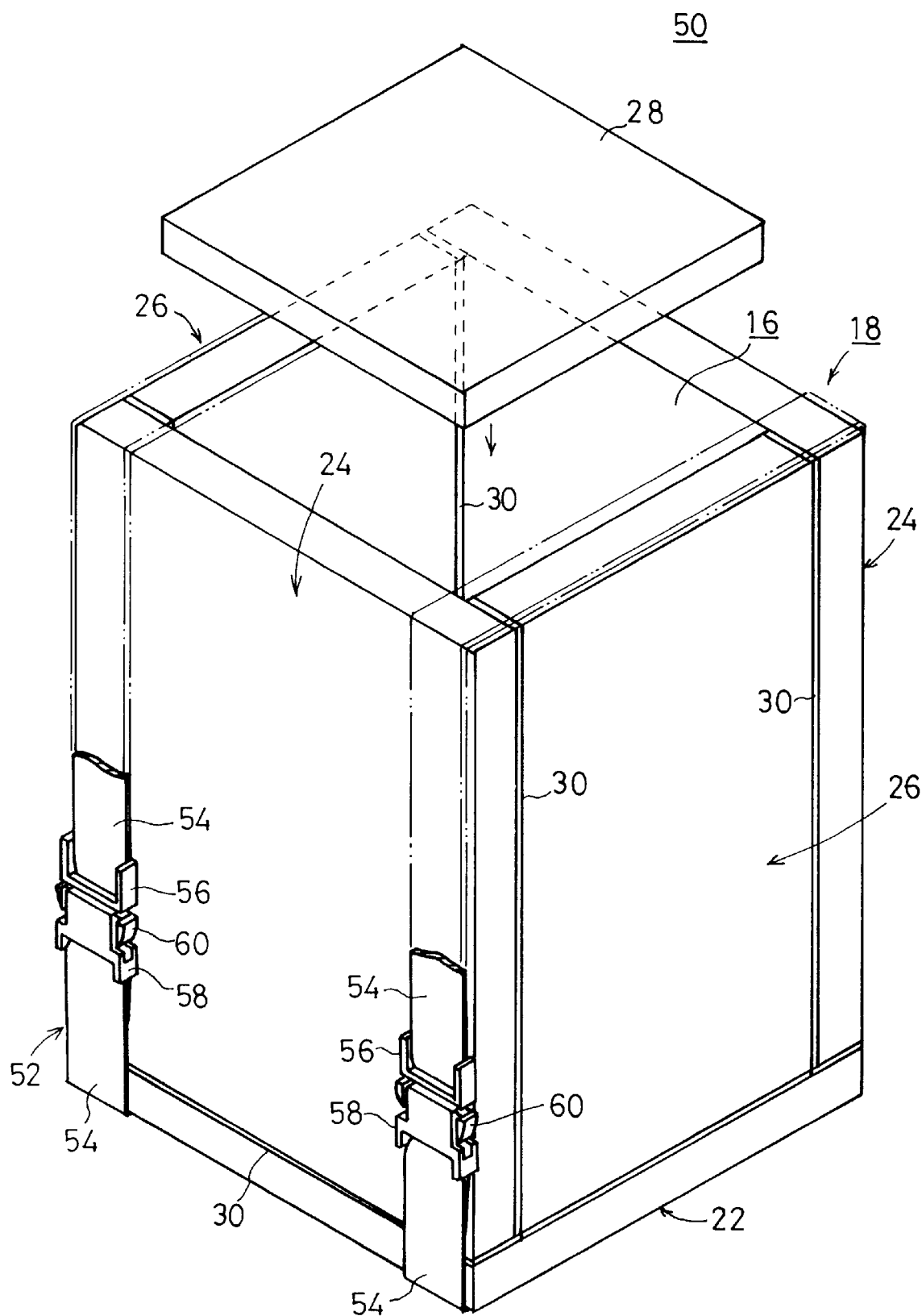
FIG. 3 is a perspective view of a form for manufacturing a resin mold according to a second embodiment of the present invention.

FIG. 3 shows a form 50 for manufacturing a resin mold according to a second embodiment of the present invention. Those parts of the form 50 which are identical to those of the form 10 according to the first embodiment are denoted by identical reference numerals, and will not be described in detail below.

As shown in FIG. 3, the form 50 has a plurality of repeatedly usable fasteners 52, instead of the fasteners 20, each comprising an elastic band 54 extending around the frame 18 and a pair of detachable joints 56, 58 attached to respective opposite ends of the elastic band 54. One of the joints 56 has a release member 60 for releasing the joints 56, 58 from a joined state.

In the second embodiment, as described above, each of the repeatedly usable fasteners 52 has the elastic band 54 whose opposite ends can quickly and easily be connected and disconnected. The fasteners 52 allow the frame 18 to be assembled and disassembled easily in a short period of time.

Figure 4:
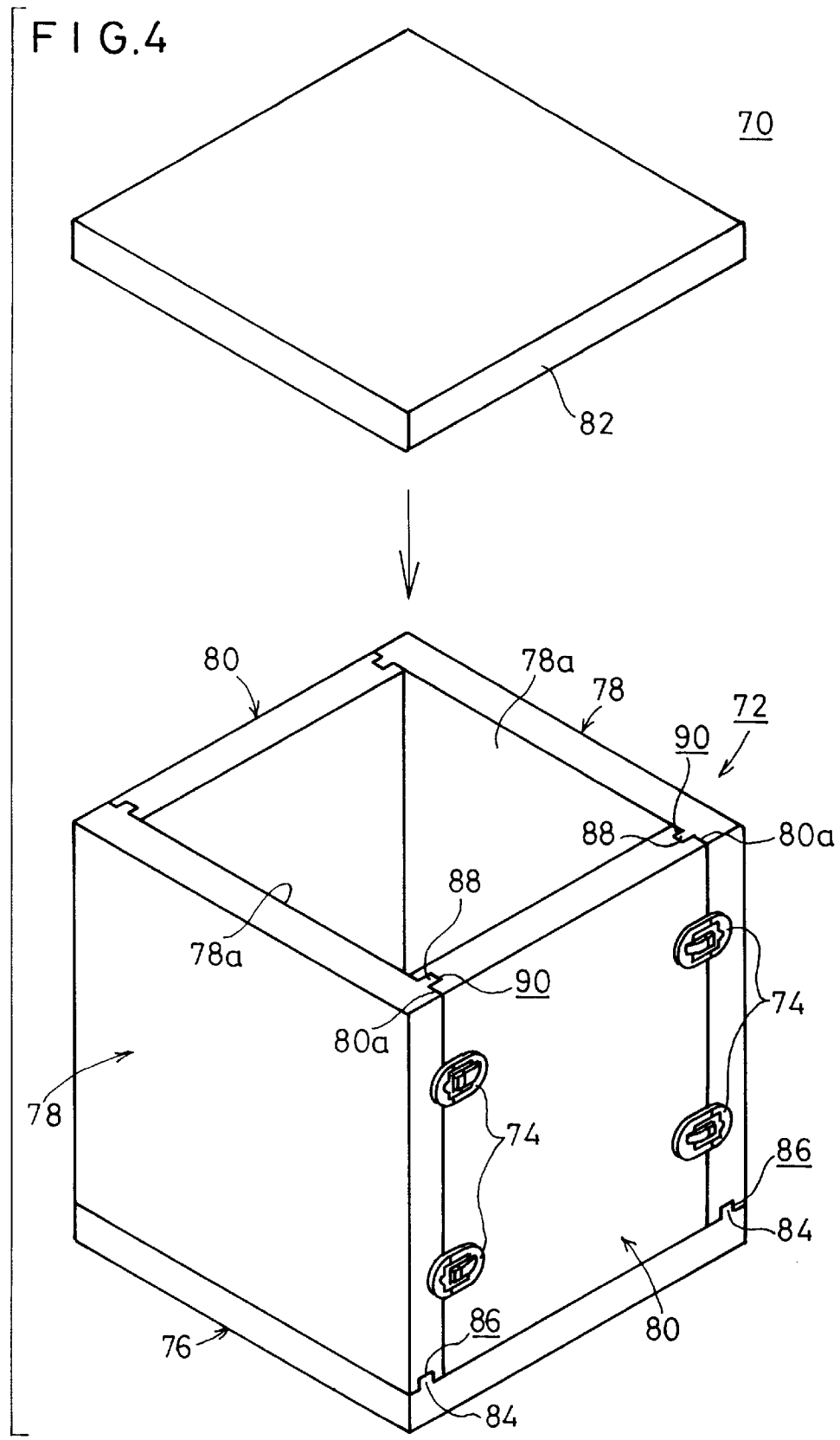
FIG. 4 is a perspective view of a form for manufacturing a resin mold according to a third embodiment of the present invention.

FIG. 4 shows a form 70 for manufacturing a resin mold according to a third embodiment of the present invention.

As shown in FIG. 4, the form 70 comprises a frame 72 and a plurality of repeatedly usable fasteners 74 for integrally holding the frame 72 together. The frame 72 comprises a bottom plate 76, a pair of parallel spaced first side plates 78 vertically disposed on the bottom plate 76 and serving as side walls, a pair of parallel spaced second side plates 80 vertically disposed on the bottom plate 76 and serving as side walls lying perpendicularly to the side walls provided by the first side plates 78, and a lid plate 82 insertable in the space 16 at an end of the frame 72 remote from the bottom plate 76. Each of the bottom plate 76, the first side plates 78, the second side plates 80, and the lid plate 82 comprises a transparent plate of acrylic resin.

The bottom plate 76 has a pair of horizontal ridges 84 disposed on and along opposite side edges of an upper surface thereof and fitted in respective grooves 86 that are defined in lower ends of the first side plates 78. The bottom plate 87 and the first side plates 78 are thus combined with each other by the ridges 84 fitted in the grooves 86. The first side plates 78 have vertical ridges 88 disposed on and along opposite side edges of inner surfaces thereof and fitted in respective grooves 90 that are defined in opposite ends 80a of the second side plates 80. The first and second side plates 78, 80 are thus combined with each other by the ridges 88 fitted in the grooves 90. The second side plate 80 may be combined with the bottom plate 76 by ridges and grooves that are similar to the ridges 84 and the grooves 86, or may simply be placed on the flat upper surface of the bottom plate 76 as shown.

The fasteners 74 comprise known buckles and will not be described in detail below.

With the form 70, the first and second side plates 78, 80 are combined with each other through interfitting engagement by the ridges 88 fitted in the grooves 90, and the first and second side plates 78, 80 are combined with the bottom plate 76 through interfitting engagement by the ridges 84 and the grooves 86.

The interfitting joints between the bottom plate 76 and the first and second side plates 78, 80 serve as seals for preventing the resin from leaking out of the frame 72. Since the frame 72 does not use any transparent adhesive tapes, it can economically be used repeatedly a number of times.

Figure 5:
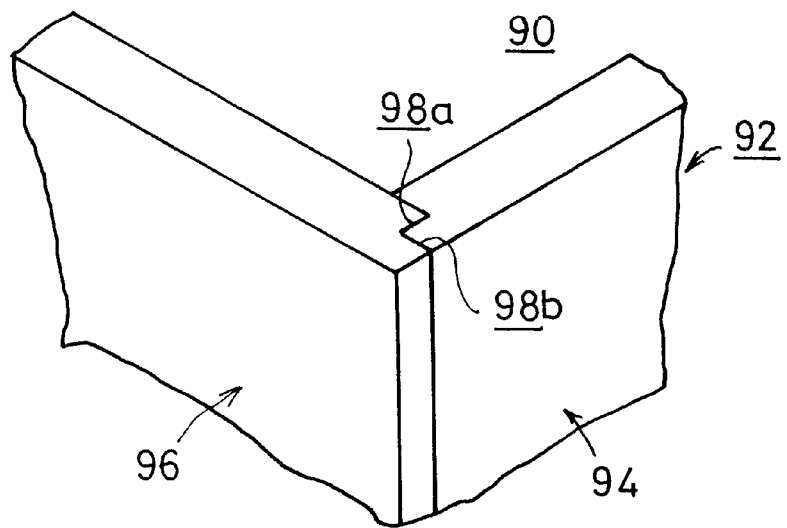
FIG. 5 is a fragmentary perspective view of a frame of a form for manufacturing a resin mold according to a fourth embodiment of the present invention.

FIG. 5 fragmentarily shows a frame 92 of a form 90 for manufacturing a resin mold according to a fourth embodiment of the present invention.

As show in FIG. 5, the frame 92 includes first and second side plates 94, 96 having vertical recesses 98a, 98b, respectively, defined by respective teeth that are fitted into the recesses 98b, 98a, respectively, thereby holding the first and second side plates 94, 96 in interfitting engagement with each other in a liquid-tight fashion.

Figure 6:
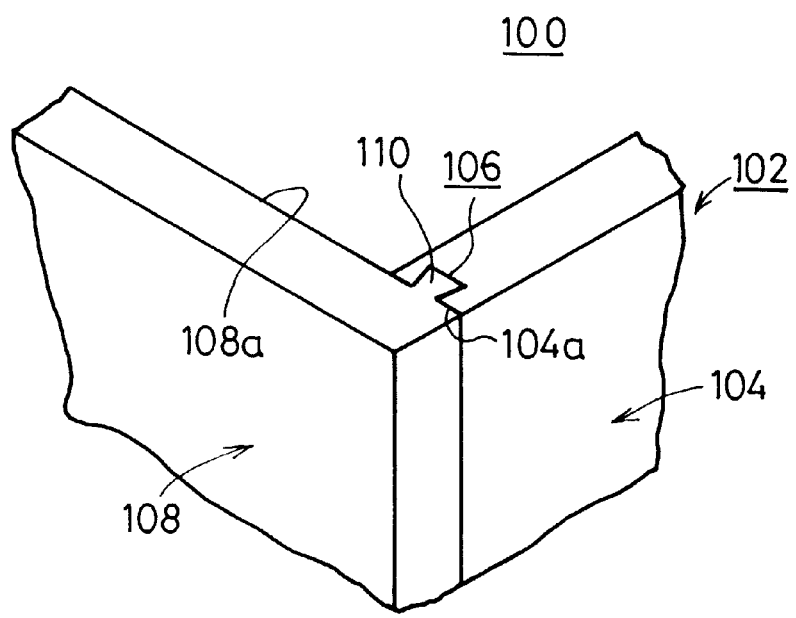
FIG. 6 is a fragmentary perspective view of a frame of a form for manufacturing a resin mold according to a fifth embodiment of the present invention.

FIG. 6 fragmentarily shows a frame 102 of a form 100 for manufacturing a resin mold according to a fifth embodiment of the present invention.

As shown in FIG. 6, the frame 102 includes first and second side plates 104, 108. The first side plate 104 has a vertical dovetail groove 106 defined in an end 104a thereof, and the second side plate 108 has a vertical dovetail 110 projecting from an edge of an inner surface thereof. The dovetail 110 is vertically slid into the dovetail groove 106 until the dovetail 110 is fully fitted in the dovetail groove 106, whereupon the first and second side plates 104, 108 are held in interfitting engagement with each other in a liquid-tight fashion.

According to the fourth and fifth embodiments, the forms 90, 100 need no transparent adhesive tapes, but are capable of preventing the resin from leaking out of the frames 92, 102 and offer the same advantages as those of the form 70 according to the third embodiment.

Figure 7:
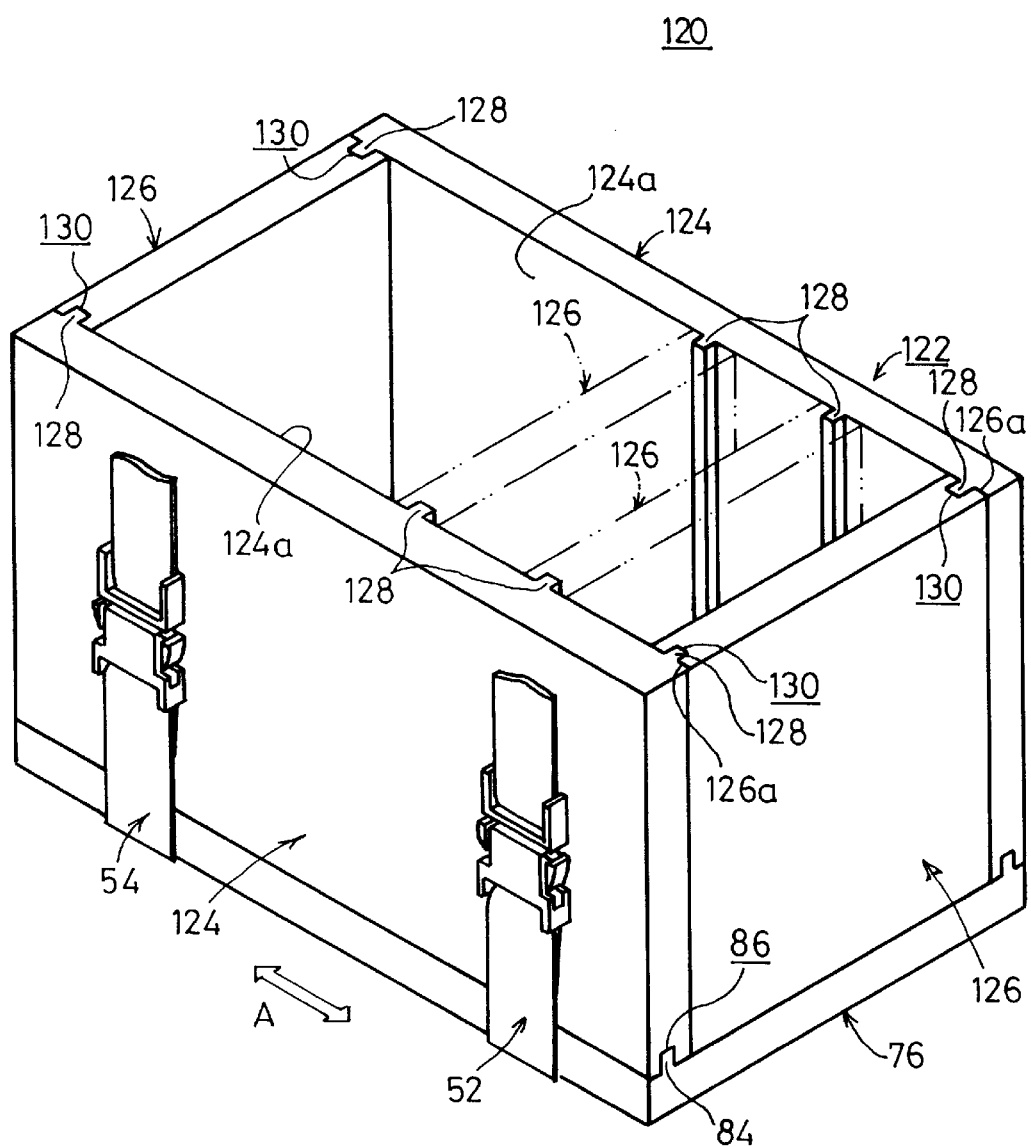
FIG. 7 is a perspective view of a form for manufacturing a resin mold according to a sixth embodiment of the present invention.

FIG. 7 shows a form 120 for manufacturing a resin mold according to a sixth embodiment of the present invention. Those parts of the form 120 which are identical to those of the forms 50, 70 according to the second and third embodiments are denoted by identical reference numerals, and will not be described in detail below.

The form 120 has a frame 122 including a pair of parallel spaced first side plates 124 elongate in the directions indicated by the arrow A, and a pair of parallel spaced second side plates 126 disposed between and shorter than the first side plates 124. The first side plates 124 have spaced pairs of vertical ridges (first engaging portions) 128 disposed on inner surfaces 124a thereof. The second side plate 126 has grooves (second engaging portions) 130 that are defined in opposite ends 126a thereof.

To assemble the form 120, the second side plates 126 are positioned in vertical alignment with any desired one of the pairs of vertical ridges 128, and vertically displaced to cause their grooves 130 to receive the respective ridges 128. Therefore, the second side plates 126 may be positioned with respect to the first side plates 124 at any one of the given positions corresponding to the pairs of vertical ridges 128 with respect to the directions indicated by the arrow A. Accordingly, the distance between the second side plates 126 may be varied depending on the different sizes of master models used. The form 120 which is thus capable of changing its size is versatile in its applications.

Figure 8:
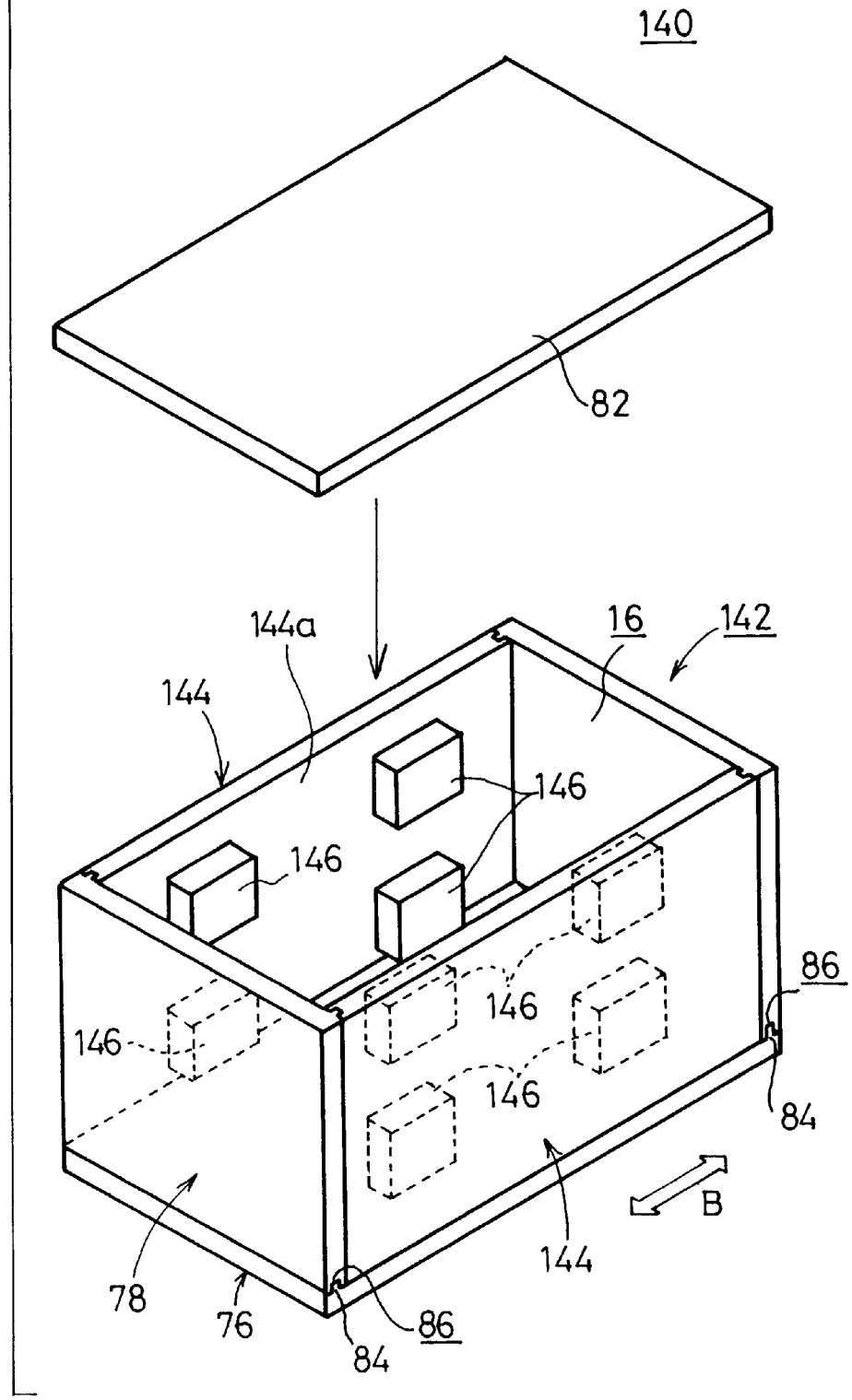
FIG. 8 is a perspective view of a form for manufacturing a resin mold according to a seventh embodiment of the present invention.
Figure 9:
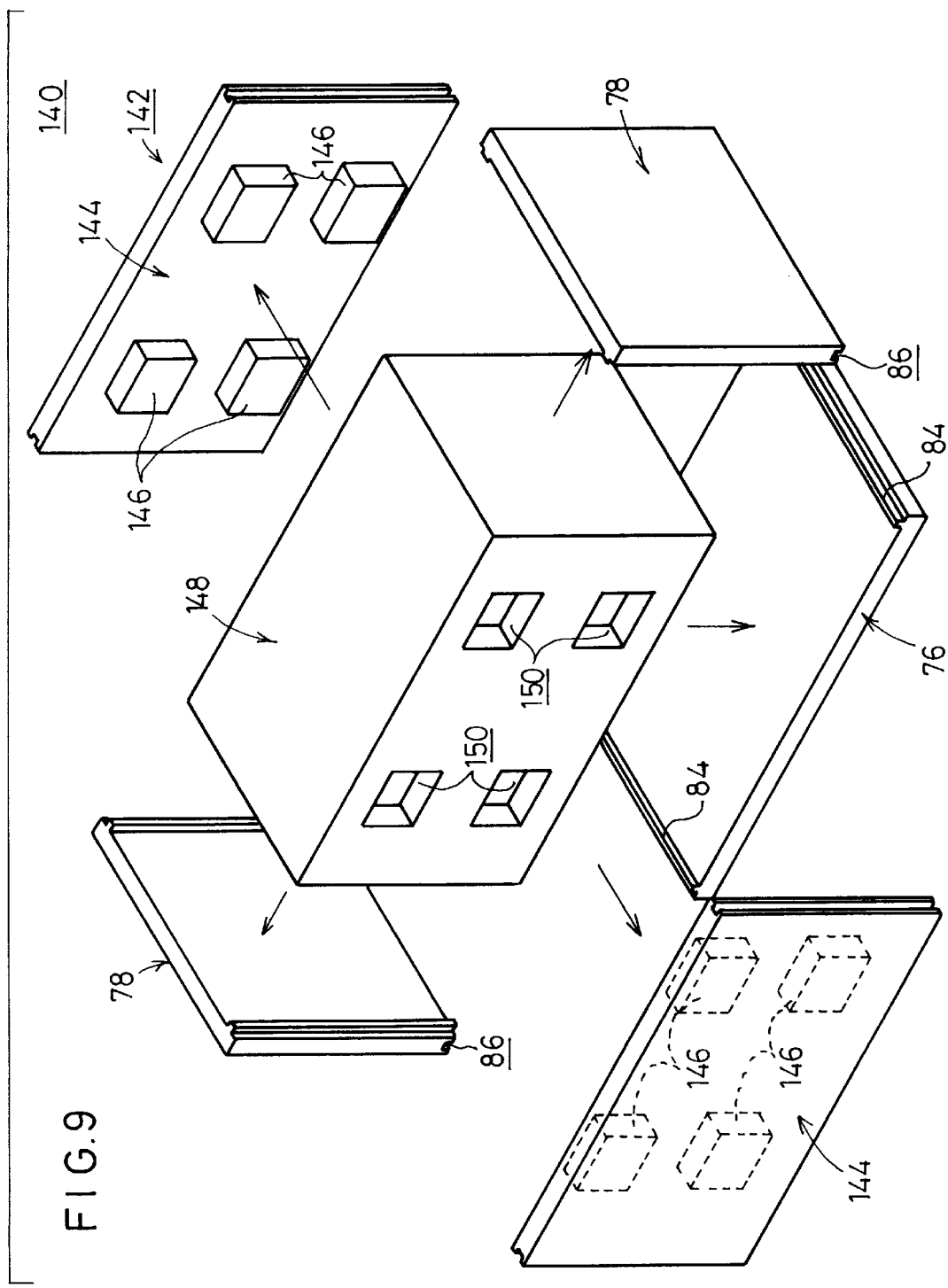
FIG. 9 is an exploded perspective view of the form shown in FIG. 8.

FIGS. 8 and 9 show a form 140 for manufacturing a resin mold according to a seventh embodiment of the present invention. Those parts of the form 140 which are identical to those of the form 70 according to the third embodiment are denoted by identical reference numerals, and will not be described in detail below.

The form 140 has a frame 142 including a pair of parallel spaced second side plates 144 elongate in the directions indicated by the arrow A. The second side plates 144 have a plurality of horizontally and vertically spaced blocks 146 disposed on inner surfaces 144a thereof and projecting into the space 16.

When a ultraviolet-curable resin is poured into the space 16 around a master model and cured into a resin mold 148 (see FIG. 9) by exposure to ultraviolet radiation, the resin mold 148 has a plurality of recesses 150 defined in opposite surfaces thereof which are formed by the respective blocks 146 of the second side plates 144. After the resin mold 148 is split into two members, the master model is removed therefrom. When a product is molded by the resin mold 148, the resin mold 148 can effectively be prevented from being positionally displaced using the recesses 150 as a positioning aid. At the same time, the second side plates 144 may be used as clamping members for clamping the form 140.

The second side plates 144 may have a plurality of horizontal and vertically spaced recesses, rather than the blocks 146, defined in inner surfaces 144a thereof. With this modification, projecting blocks, rather than the recesses 150, are formed on opposite surfaces of the resin mold 148 when it is formed by the form 140.

Figure 10:
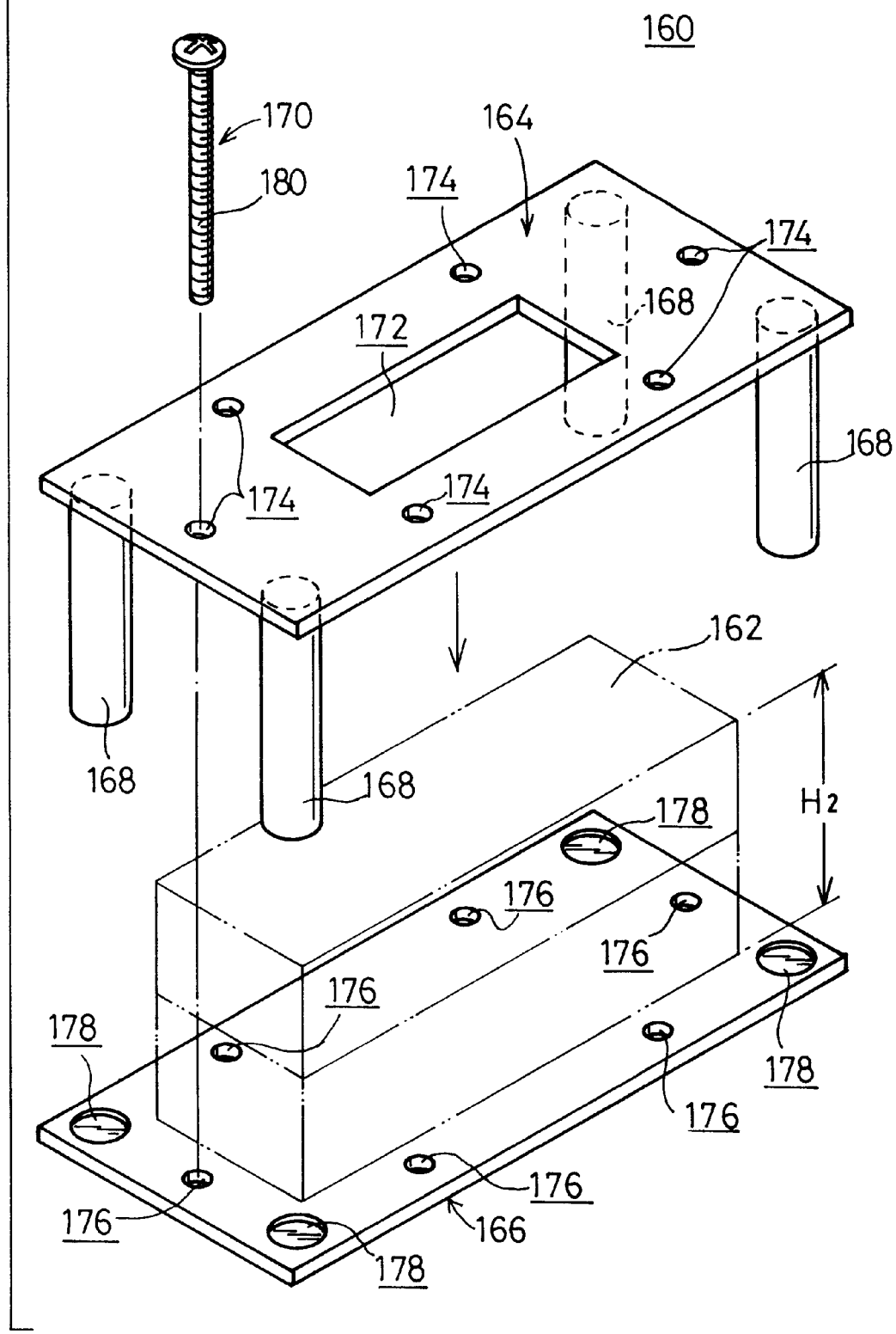
FIG. 10 is an exploded perspective view of a clamping jig for a resin mold according to an eighth embodiment of the present invention.
Figure 11:
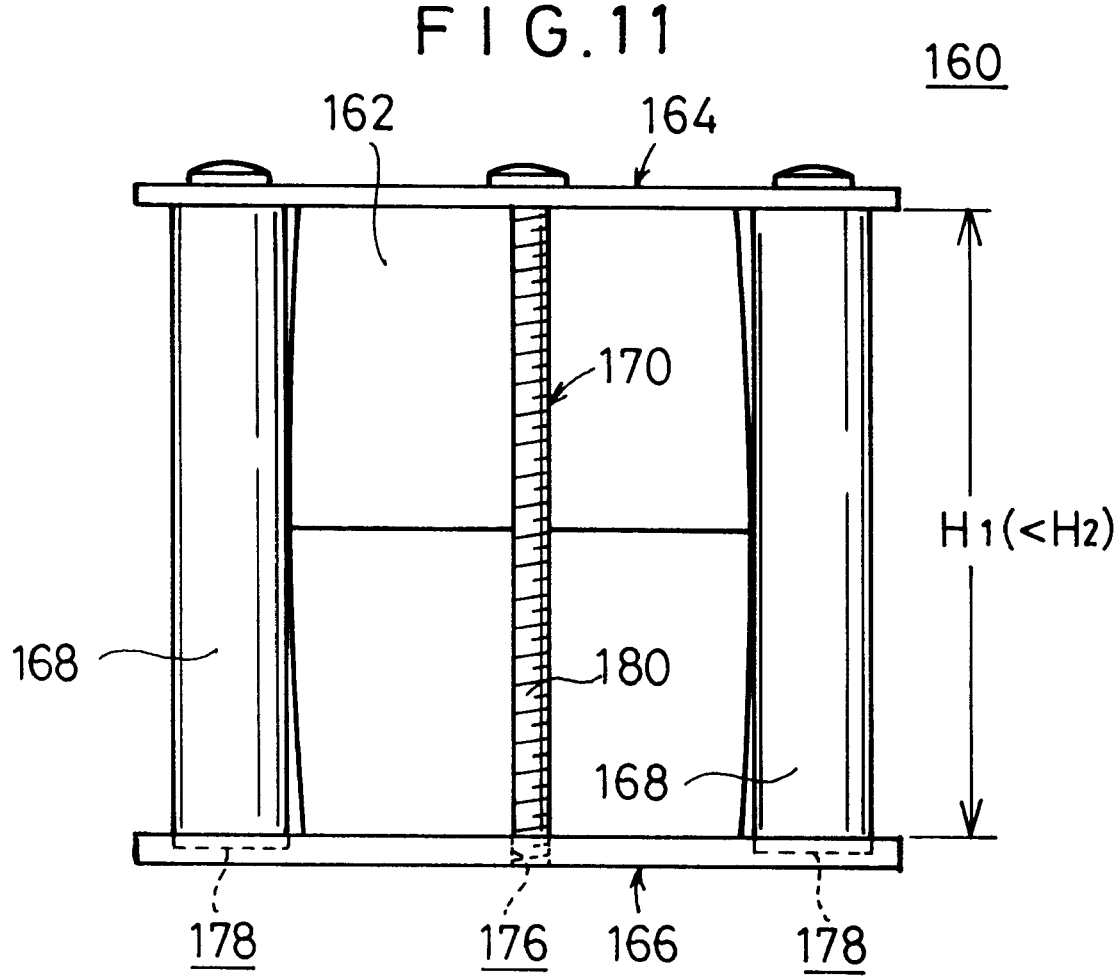
FIG. 11 is a side elevational view of the clamping jig shown in FIG. 10.

FIGS. 10 and 11 show a clamping jig 160 for a resin mold according to an eighth embodiment of the present invention.

As shown in FIG. 10, the clamping jig 160 comprises a pair of parallel, vertically spaced first and second ultraviolet-permeable sandwiching plates 164, 166 disposed in confronting relation to upper and lower surfaces, respectively, of a resin mold 162 that has been split at least along a horizontal plane, a plurality of vertical ultraviolet-permeable spacers 168 disposed between confronting surfaces of the first and second sandwiching plates 164, 166 outside of the resin mold 162, and a plurality of fasteners 170 by which the first and second sandwiching plates 164, 166 are integrally clamped together through the spacers 168. The first sandwiching plate 160 is placed on the upper surface of the resin mold 162, and has a central rectangular opening 172 for introducing an ultraviolet-curable resin therethrough into the resin mold 162.

The first sandwiching plate 164 has a plurality of bolt insertion holes 174 defined therein at positions outward of the opening 172. The spacers 168 are fixed at their upper ends to respective four corners of the lower surface of the first sandwiching plate 164. The first and second sandwiching plates 164, 166 and the spacers 168 are made of an ultraviolet-permeable acrylic resin, for example. The spacers 168 are cylindrical in shape, for example.

The second sandwiching plate 166 is placed on the lower surface of the resin mold 162, and has a plurality of threaded holes 176 defined therein in vertical registry with the bolt insertion holes 174 in the first sandwiching plate 164. The second sandwiching plate 166 also has cylindrical recesses 178 of given depth defined respectively in four corners of the upper surface thereof for receiving lower ends of the respective spacers 168. The fasteners 170 comprise bolts 180 which are inserted downwardly through the respective bolt insertion holes 174 and threaded into the respective threaded holes 176.

As shown in FIG. 11, when the spacers 168 are sandwiched by the first and second sandwiching plates 164, 166, the distance H1 between the inner surfaces of the first and second sandwiching plates 164, 166 is smaller than the height or vertical dimension H2 (see FIG. 10) of the resin mold 162 to be sandwiched between the inner surfaces of the first and second sandwiching plates 164, 166.

With the form 160, the resin mold 162 is placed on the second sandwiching plate 166, and the lower ends of the spacers 168 fixed to the first sandwiching plate 164 are fitted respectively in the recesses 178 in the second sandwiching plate 166. The bolts 180 are inserted through the bolt insertion holes 174 and threaded into the threaded holes 176, causing the first and second sandwiching plates 164, 166 to clamp the resin mold 162.

Then, an ultraviolet-curable resin, such as ultraviolet-vulcanizable silicone rubber, is poured through the opening 172 into the cavity (not shown) in the resin mold 162, and thereafter exposed to ultraviolet radiation. The ultraviolet-curable resin in the resin mold 162 is cured into a product. Subsequently, the bolts 180 are removed from the threaded holes 176, and then the first sandwiching plate 164 is detached. The resin mold 162 is split, allowing the product to be taken out.

With the form 160, the first and second sandwiching plates 164, 166 and the spacers 168 are made of an ultraviolet-permeable material such as acrylic resin, for example. Therefore, the ultraviolet-curable resin filled in the resin mold 162 can be cured into a desired product quickly and reliably by exposure to ultraviolet radiation applied from outside of the resin mold 162.

The distance H1 between the inner surfaces of the first and second sandwiching plates 164, 166 that hold the spacers 168 therebetween is smaller than the height H2 of the resin mold 162. Consequently, as shown in FIG. 11, when the upper and lower surfaces of the resin mold 162 are held by the first and second sandwiching plates 164, 166 and the first and second sandwiching plates 164, 166 are securely clamped together by the fasteners 170, the resin mold 162 is slightly elastically deformed under the pressure imposed by the fasteners 170.

Since certain clamping forces are applied to the resin mold 162, the resin mold 162 is kept dimensionally secure to prevent the cavity therein from being unduly deformed and also to prevent the poured ultraviolet-curable resin from leaking out of the cavity through the gap between the split members of the resin mold .162.

Figure 12:
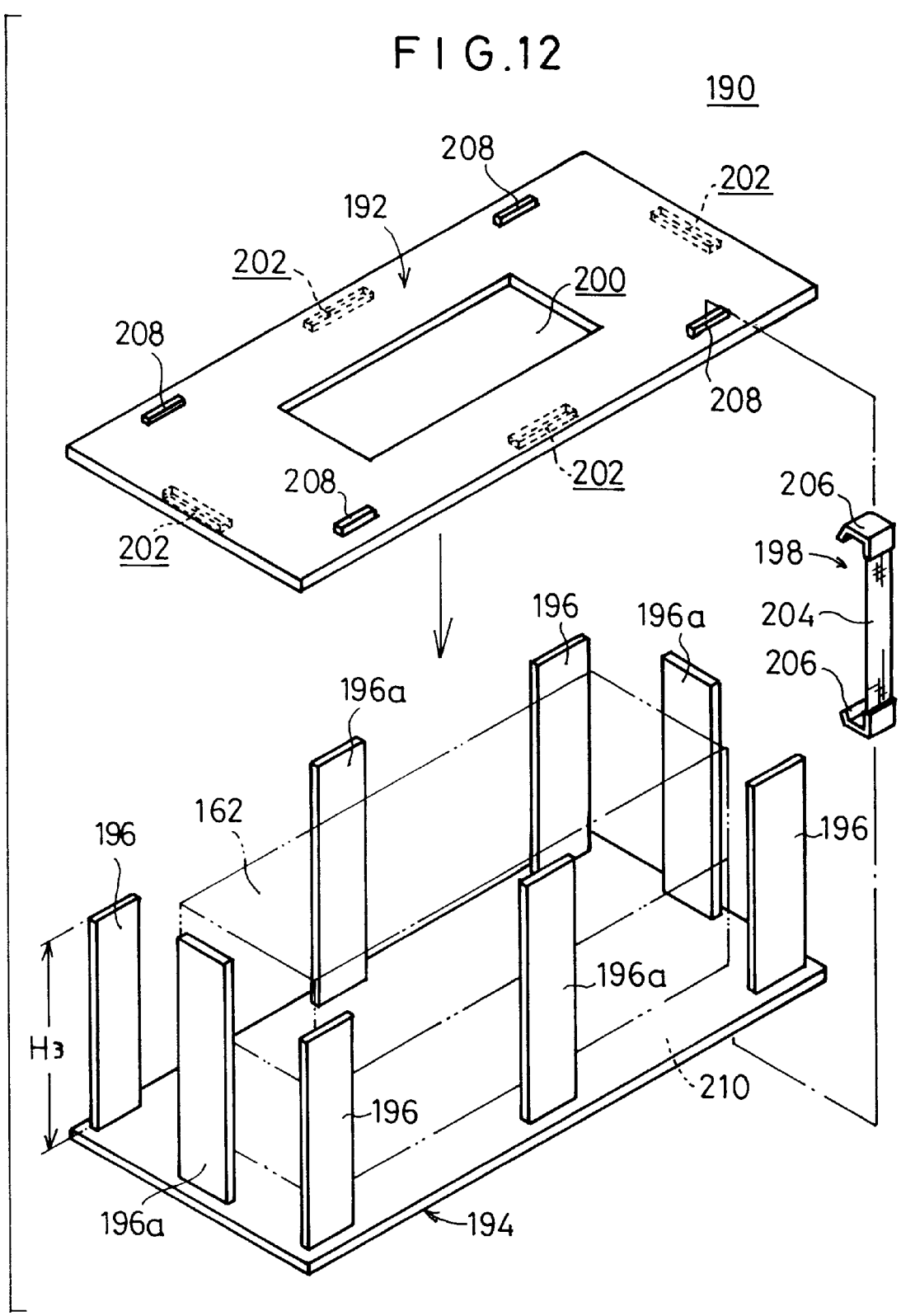
FIG. 12 is an exploded perspective view of a clamping jig for a resin mold according to a ninth embodiment of the present invention.
Figure 13:
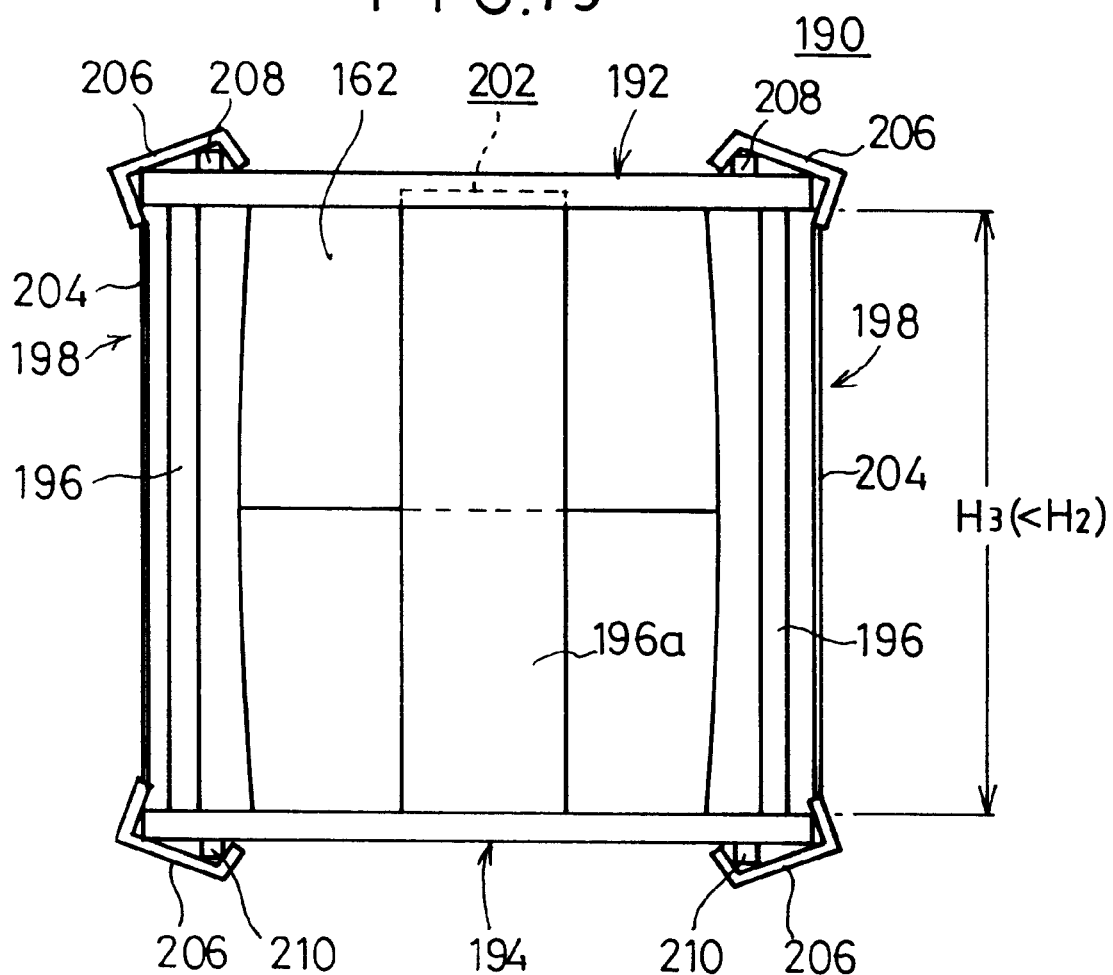
FIG. 13 is a side elevational view of the clamping jig shown in FIG. 12.

FIGS. 12 and 13 show a clamping jig 190 for a resin mold according to a ninth embodiment of the present invention.

As shown in FIG. 12, the clamping jig 190 comprises a pair of parallel, vertically spaced first and second ultraviolet-permeable sandwiching plates 192, 194 disposed in confronting relation to upper and lower surfaces, respectively, of the resin mold 162, a plurality of vertical ultraviolet-permeable spacers 196 disposed between confronting surfaces of the first and second sandwiching plates 192, 194 outside of the resin mold 162, and a plurality of fasteners 198 by which the first and second sandwiching plates 192, 194 are integrally clamped together through the spacers 196. The first sandwiching plate 160 is placed on the upper surface of the resin mold 162, and has a central rectangular opening 172 for introducing an ultraviolet-curable resin therethrough into the resin mold 162.

The first and second sandwiching plates 192, 194 and the spacers 196 are made of an ultraviolet-permeable material such as acrylic resin, for example. The first sandwiching plate 192, which is placed on the upper surface of the resin mold 162 has a central rectangular opening 200 for introducing an ultraviolet-curable resin therethrough into the resin mold 162. The first sandwiching plate 192 has four rectangular recesses 202 defined in the lower surface thereof which are positioned centrally along its respective four sides.

The spacers 196 are secured at their lower ends on the upper surface of the second sandwiching plate 194. The spacers 196 are in the form of plates, and include spacers 196a positioned in vertical alignment with the recesses 202 and longer than the other spacers 196 by a dimension equal to the depth of the recesses 202.

Each of the fasteners 198 comprises an elastic band 204 and hooks 206 mounted on respective opposite ends of the elastic band 204. The first and second sandwiching plates 192, 194 have engaging ridges 208, 210, four on each of the first and second sandwiching plates 192, 194, which can be engaged by the hooks 206 of the fasteners 198. The elastic band 204 has a length H3 which is smaller a certain dimension than the height H2 of the resin mold 162.

With the clamping jig 190, the resin mold 162 is first placed on the second sandwiching plate 194, and then the first sandwiching plate 192 is placed on the resin mold 162. The first sandwiching plate 192 is positioned by the upper ends of the spacers 196a which engage in the recesses 202, with the upper ends of the other spacers 196 being held against the lower surface of the first sandwiching plate 192.

Then, the hooks 206 of the fasteners 198 are brought into engagement with the engaging ridges 208, 210, holding the first and second sandwiching plates 192, 194 tightly together through the spacers 196, 196a. Thereafter, an ultraviolet-curable resin is poured through the opening 200 into the cavity (not shown) in the resin mold 162, and thereafter cured into a product by exposure to ultraviolet radiation.

The clamping jig 198 allows ultraviolet radiation to be applied reliably to the ultraviolet-curable resin in the resin mold 162 for thereby curing the ultraviolet-curable resin into a product, and can clamp the resin mold 162 under desired clamping forces. The clamping jig 198 thus offers the s am e advantages as those of the clamping jig 160 according to the eighth embodiment.

Figure 14:
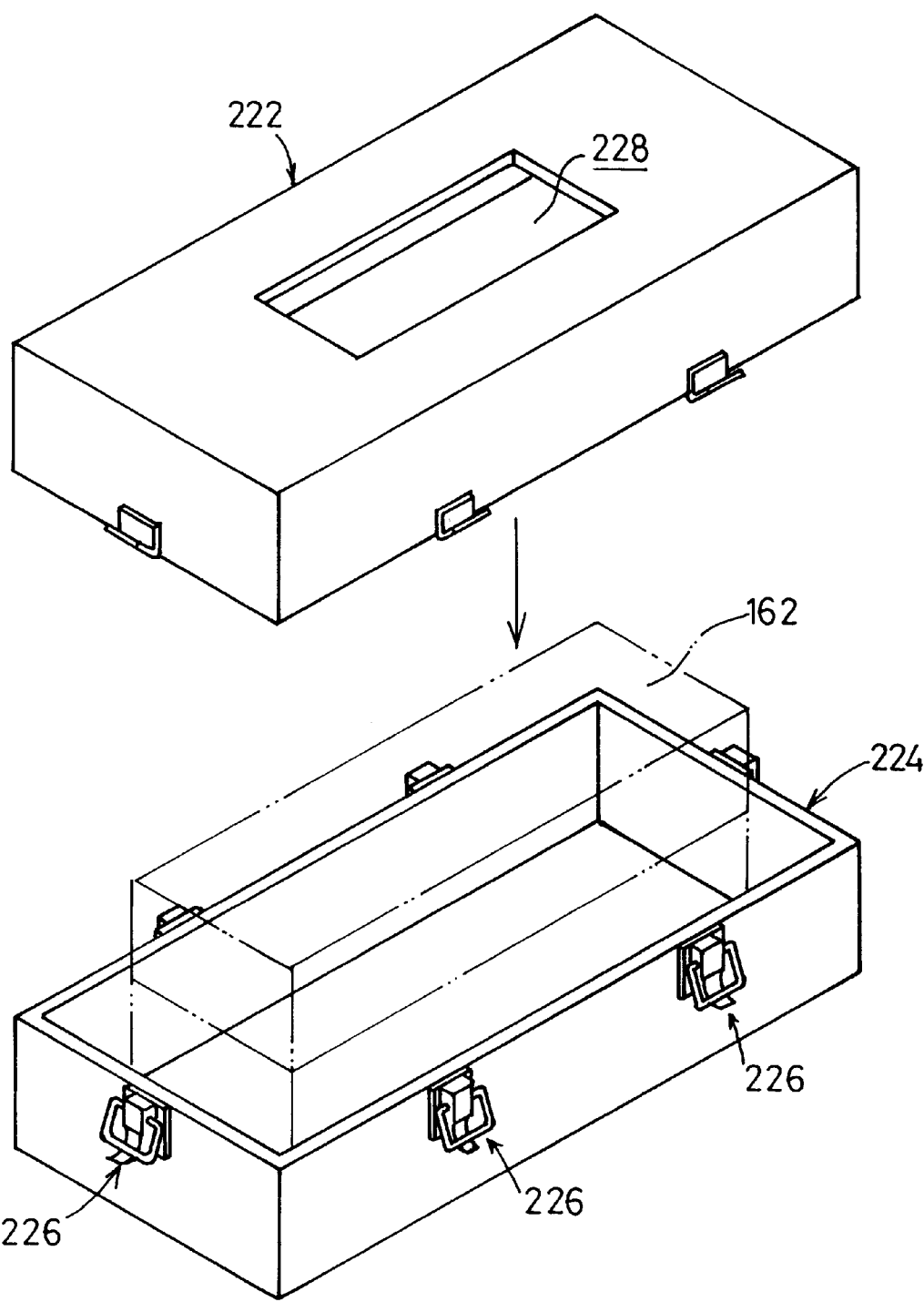
FIG. 14 is an exploded perspective view of a clamping jig for a resin mold according to a tenth embodiment of the present invention.

FIGS. 14 and 15 illustrate a clamping jig 220 for a resin mold according to a tenth embodiment of the present invention.

The clamping jig 220 comprises a pair of first and second ultraviolet-permeable cases 222, 224 disposed on upper and lower surfaces of the resin mold 162 and closable and openable with respect to each other, and a plurality of fasteners 226 for holding the first and second cases 222, 224 together with the resin mold 162 housed therein. The first case 222 has a central rectangular opening 228 for Introducing an ultraviolet-curable resin therethrough into the resin mold 162.

The fasteners 226 comprise respective buckles mounted on the first and second cases 222, 224 at spaced positions thereon. The distance H4 (see FIG. 15) between the inner surfaces of the first and second cases 222, 224 is smaller than the height H2 of the resin mold 162.

After the resin mold 162 is placed in the second case 224, the first case 222 is placed on the upper surface of the resin mold 162. The first and second cases 222, 224 are firmly clamped together with the resin mold 162 housed therein, by the fasteners 226. Then, an ultraviolet-curable resin is poured through the opening 228 into the resin mold 162.

Ultraviolet radiation is applied from outside of the first and second cases 222, 224 to cure the ultraviolet-curable resin into a product in the resin mold 162. Thereafter, the fasteners 226 are loosened, and the first and second cases 222, 224 separated from each other, after which the product is removed from the resin mold 162.

As with the clamping jigs 160, 190, the clamping jig 220 allows ultraviolet radiation to be applied reliably to the ultraviolet-curable resin in the resin mold 162 for thereby curing the ultraviolet-curable resin into a product. Furthermore, as shown in FIG. 15, when the resin mold 16 is placed between the first and second cases 222, 224, the resin mold 162 is clamped under desired clamping forces. The cavity in the resin mold 162 is thus prevented from being unduly deformed, and the poured ultraviolet-curable resin is prevented from leaking out of the cavity.

Figure 16:
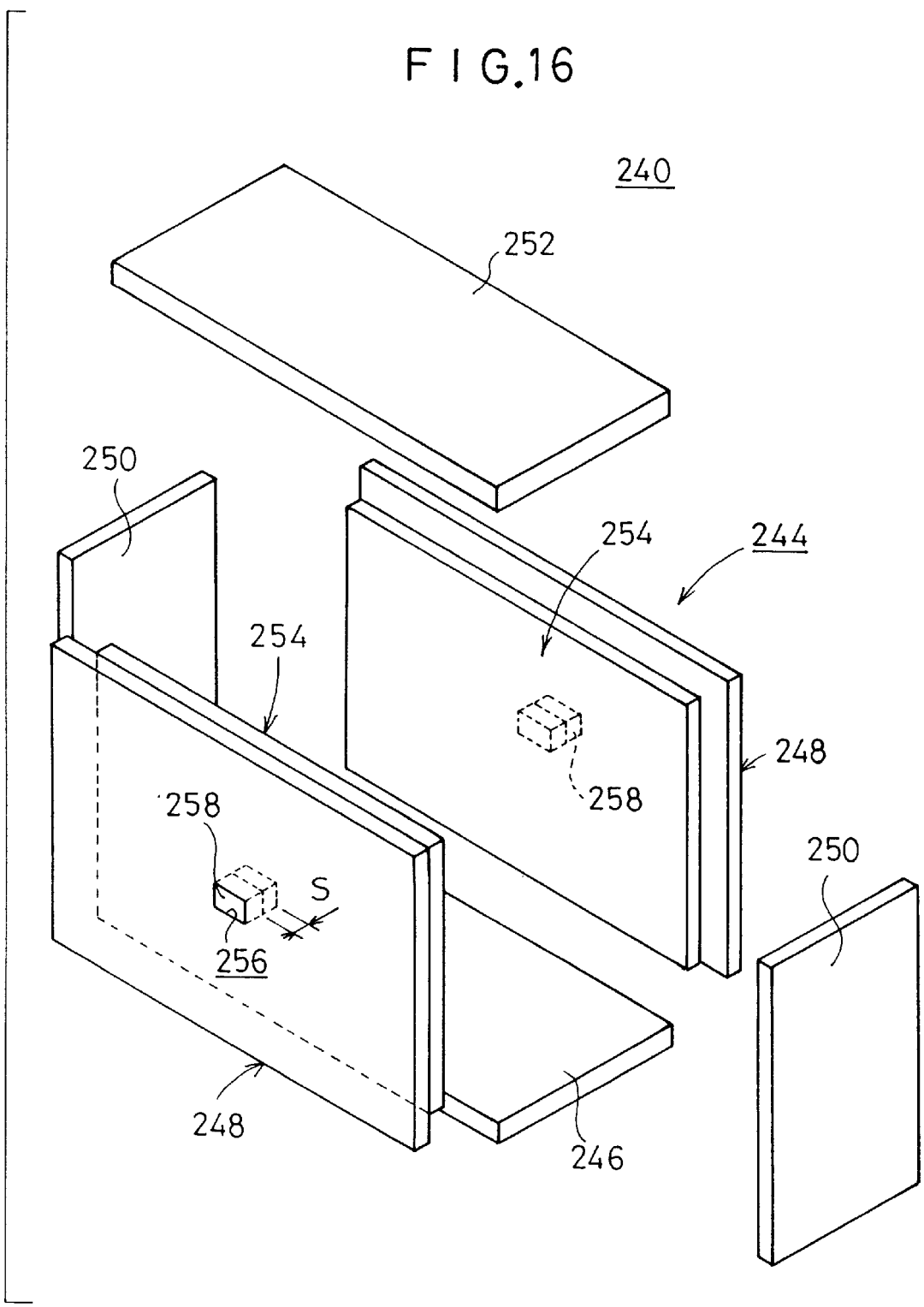
FIG. 16 is an exploded perspective view of a form for manufacturing a resin mold according to an eleventh embodiment of the present invention.
Figure 17:
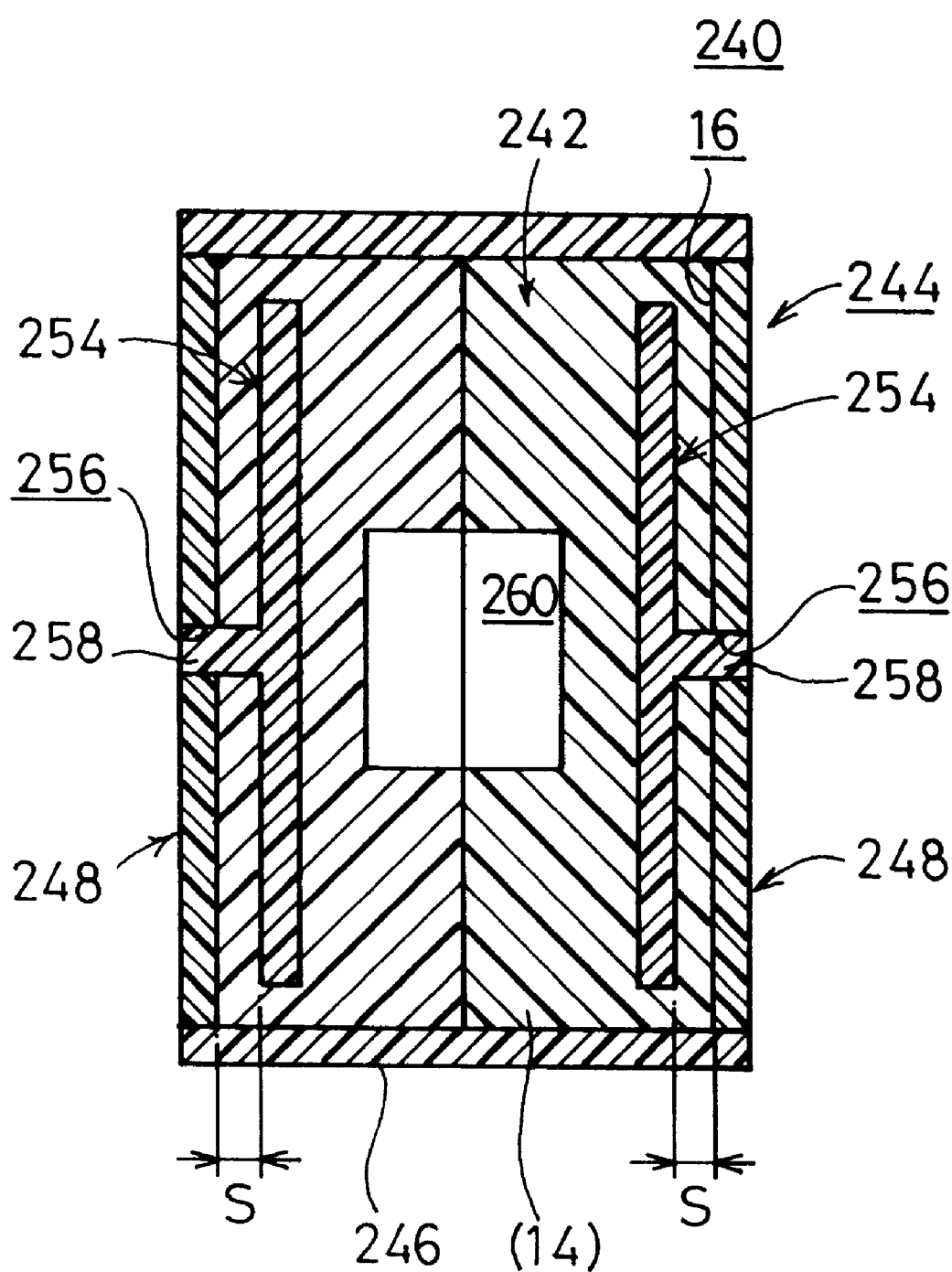
FIG. 17 is a vertical cross-sectional view of the form shown in FIG. 16.
Figure 18:
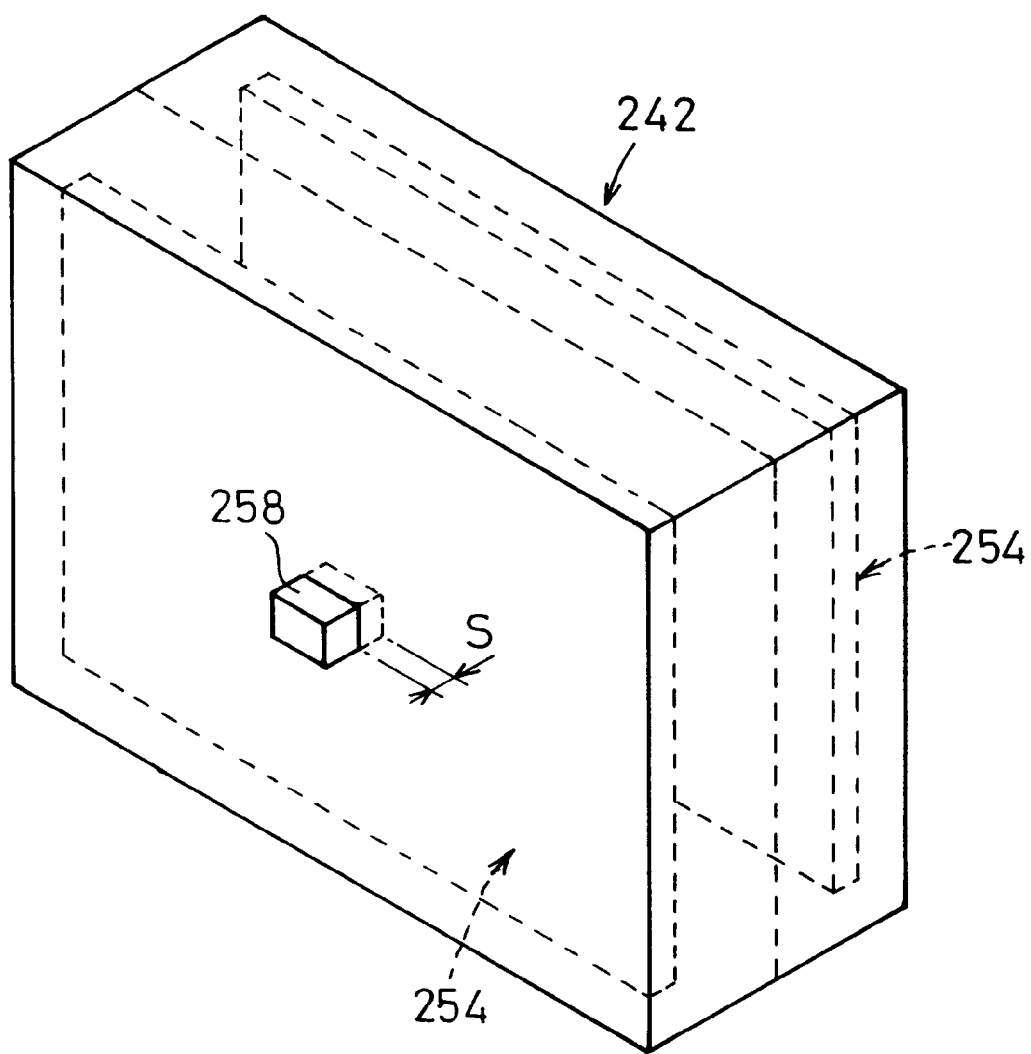
FIG. 18 is a perspective view of a resin mold manufactured by the. form shown in FIG. 16.

FIGS. 16 and 17 show a form 240 for manufacturing a resin mold according to an eleventh embodiment of the present invention, and FIG. 18 shows a resin mold 242 manufactured by the form 240 shown in FIGS. 16 and 17.

As shown in FIGS. 16 and 17, the form 240 which defines a space 16 therein has a frame 244 comprising a bottom plate 246, a pair of parallel spaced first side plates 248 vertically disposed on the bottom plate 246 and serving as side walls, a pair of parallel spaced second side plates 250 vertically disposed on the bottom plate 246 and serving as side walls lying perpendicularly to the side walls provided by the first side plates 248, a lid plate 252 insertable in the space 16 at an end of the frame 244 remote from the bottom plate 246, and a pair of transparent stiffeners 254 positioned inward of the first side plates 248 for being embedded in the resin mold 242. The frame 244 may be firmly held together by the fasteners 52 (see FIG. 3), for example.

The bottom plate 246, the first side plates 248, the second side plates 250, the lid plate 252, and the transparent stiffeners 254 are made of an ultraviolet-permeable material such as an ultraviolet-permeable resin, an ultraviolet-permeable glass, e.g., ultraviolet-permeable acrylic resin. The first side plates 248 have respective openings 256 defined substantially centrally therein, and the transparent stiffeners 254 have projections 258 inserted respectively into the openings 256 with a gap S left between the first side plates 248 and the transparent stiffeners 254.

As shown in FIG. 17, an ultraviolet-curable resin 14 such as ultraviolet-vulcanizable silicone rubber is poured into the space 16, and is exposed to ultraviolet radiation applied from outside of the form 240. The ultraviolet-curable resin 14 is cured into a resin mold 242 (see FIG. 18) with the transparent stiffeners 254 embedded therein.

Therefore, the resin mold 242 has its mechanical strength increased by the embedded transparent stiffeners 254. When the resin mold 242 is clamped, a cavity 260 defined in the resin mold 242 is effectively prevented from being unduly deformed. Accordingly, a high-quality product can be molded in the cavity 260.

The transparent stiffeners 254 made of acrylic resin are more permeable to ultraviolet radiation than the resin mold 242 made of silicone rubber. Therefore, even if the resin mold 242 has a large thickness, the transparent stiffeners 254 allow ultraviolet radiation to be introduced reliably into the cavity 260 in the resin mold 242 because the overall permeability to ultraviolet radiation of the resin mold 242 is increased by the transparent stiffeners 254.

After the resin mold 242 is formed, the resin mold 242 is split into two members, for example, and the master model (not shown) is removed from the resin mold 242, leaving the cavity 260. The resin mold 242 is clamped, and an ultraviolet-curable resin 14 is poured into the cavity 260. At this time, the form 240 can be used as a clamping jig for the resin mold 242.

Specifically, the projections 258 of the transparent stiffeners 254 embedded in the resin mold 242 project outwardly from substantially central areas of the opposite outer surfaces of the resin mold 242. By inserting the projections 258 into the respective openings 256 in the first side plates 248, the first side plates 248 and the resin mold 242 can be positioned relatively to each other. Therefore, the form 240 can effectively be used as a clamping jig for the resin mold 242, and provides an economic advantage because it can be used as both a form itself and a clamping jig.

Figure 19:
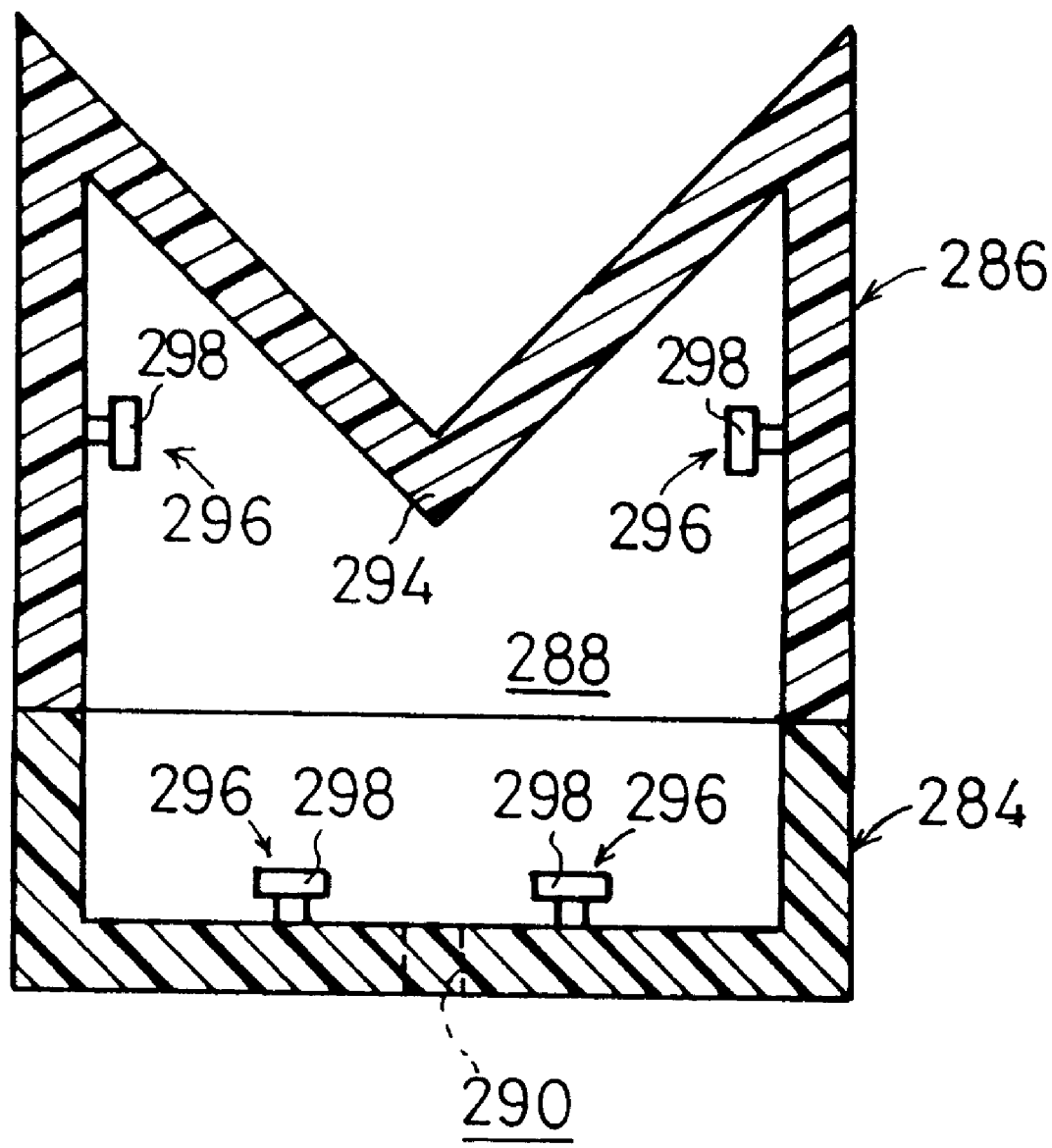
FIG. 19 is a vertical cross-sectional view of a form for manufacturing a resin mold according to a twelfth embodiment of the present invention.
Figure 20:
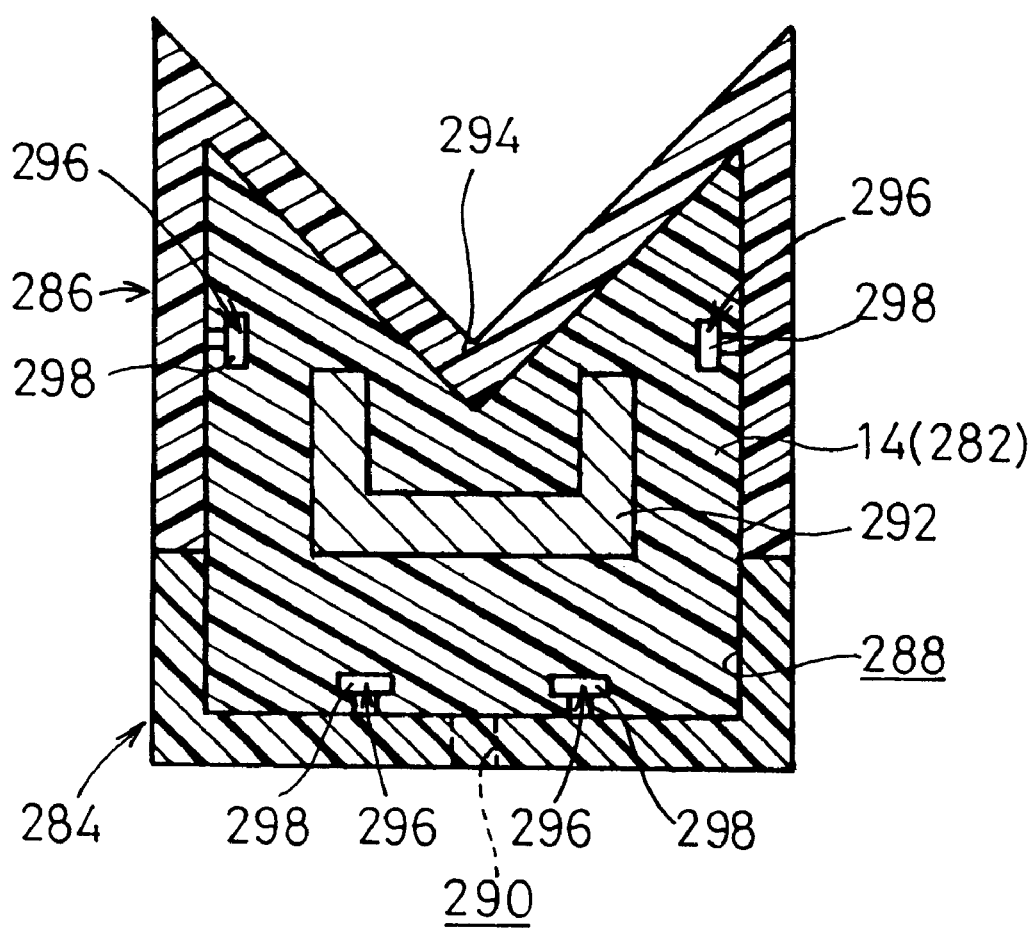
FIG. 20 is a vertical cross-sectional view showing the manner in which the form shown in FIG. 19 operates.

FIGS. 18 and 19 show a form 280 for manufacturing a resin mold according to a twelfth embodiment of the present invention, and FIG. 20 shows a resin mold 282 manufactured by the form 280 shown in FIGS. 18 and 19.

As shown in FIGS. 18 and 19, the form 280 comprises first and second frame members 284, 286 which jointly define therebetween a space 288 for receiving an ultraviolet-curable resin 14 such as ultraviolet-vulcanizable silicon rubber poured therein. The first and second frame members 284, 286 are made of an ultraviolet-permeable material such as an ultraviolet-permeable resin, an ultraviolet-permeable glass, e.g., ultraviolet-permeable acrylic resin.

The first frame member 284 has a channel-shaped cross section, and has an inlet hole 290 defined in a side wall thereof. The second frame member 286 has an M-shaped cross section including a wedge-shaped wall 294 that projects into the space 288 toward a master model 292 in the space 288. The M-shaped cross section is roughly complementary in shape to the master model 292. The first and second frame members 284, 286 have a plurality of teeth 296 projecting from inner surfaces thereof into the space 288. Each of the teeth 296 has a larger-diameter head 298 on its distal end. The frame members 284, 286 may be firmly held together by the fasteners 52 (see FIG. 3), for example.

As shown in FIG. 20, an ultraviolet-curable resin 14 such as ultraviolet-vulcanizable silicone rubber is poured into the space 288 through the inlet hole 290 around the master model 292, and is exposed to ultraviolet radiation applied from outside of the form 280. The ultraviolet-curable resin 14 is cured into a resin mold 282 (see FIG. 21) with the teeth 296 embedded therein. As shown in FIG. 21, the resin mold 282 is split into two members along a horizontal plane aligned with the joint between the first and second frame members 284, 286, and the master model 292 is removed, leaving a cavity 300.

The resin mold 282 is integrally secured to the first and second frame members 284, 286 through the teeth 296 embedded therein, and hence has its mechanical strength and ultraviolet permeability increased. Since the second frame 286 has its wedge-shaped wall 284 projecting into the space 288 toward the master model 292, the volume of the space 288 is greatly reduced. As a result, the amount of the ultraviolet-curable resin 14 poured into the space 288 is greatly reduced, so that the form 280 is economically advantageous.

When a produced is molded by the resin mold 282, the resin mold 282 is clamped by the first and second frame members 284, 286 which are integrally combined with the resin model 282. Thus, the cavity 300 defined in the resin mold 282 is effectively prevented from being unduly deformed. Accordingly, a high-quality product can be molded in the cavity 300.

While the second frame member 286 is of an M-shaped cross section in the illustrated embodiment, it may have any of various other cross-sectional shapes depending on the configuration of the master model 292.

With the form for manufacturing the resin mold according to the present invention, the frame into which the ultraviolet-curable resin is poured around the master model in the cavity is made of an ultraviolet-permeable material. Therefore, the ultraviolet-curable resin surrounding the master model in the cavity can reliably be cured by exposure to ultraviolet radiation applied outside of the frame. Consequently, the resin mold can be manufactured highly efficiently by a quick and easy process.

With the clamping jig for clamping the resin mold according to the present invention, the resin mold is securely clamped by the first and second sandwiching plates through the spacers, and the first and second sandwiching plates and the spacers are permeable to ultraviolet radiation. While the resin mold is being clamped by the clamping jig, the ultraviolet-curable resin in the resin mold is reliably cured by exposure to ultraviolet radiation.

With the other clamping jig, the resin mold is housed in the first and second cases, and the first and second cases are clamped by the fasteners. Since the first and second cases are permeable to ultraviolet radiation, the ultraviolet-curable resin in the resin mold can reliably be cured by exposure to ultraviolet radiation applied outside of the frame. Consequently, a molded product can easily and quickly be produced by the resin mold.

Although certain preferred embodiments of the present invention has been shown and described in detail, it should be understood that various changes and modifications may be made therein without departing from the scope of the appended claims.

What is claimed is:

1. A form for manufacturing a resin mold by pouring an ultraviolet-curable resin and curing the ultraviolet-curable resin to produce the resin mold by exposure to ultraviolet radiation, comprising:

a frame housing a master model corresponding in shape to a product replica and having means for supporting said master model within said frame such that a space is defined therein for receiving the ultraviolet curable resin which is poured into said frame to surround the master model;

said frame being made of an ultraviolet permeable material, wherein after curing of said ultraviolet-curable resin, said resin is removed from said frame and said master model is removed from said ultraviolet-curable resin, to thereby produce said resin mold having a cavity therein corresponding in shape to said master model.

2. A form according to claim 1, further comprising fastening means for integrally holding said frame together, said fastening means being repeatedly usable.

3. A form according to claim 1, wherein said frame includes an ultraviolet-permeable lid covering an upper surface of the ultraviolet-curable resin poured in said space.

4. A form according to claim 1, wherein said frame comprises a plurality of ultraviolet-permeable transparent plates, said plates being joined into a box by ultraviolet-permeable transparent adhesive tapes.

5. A form according to claim 1, wherein said frame comprises a plurality of ultraviolet-permeable transparent plates, said transparent plates being held in interfitting engagement with each other into a box.

6. A form according to claim 5, wherein one of said transparent plates has a dovetail groove defined therein, and another of said transparent plates has a dovetail, said dovetail being inserted in said dovetail groove to keep said transparent plates in interfitting engagement with each other.

7. A form according to claim 5, wherein said transparent plates include transparent plates having blocks or recesses on inner surfaces facing said space.

8. A form according to claim 5, wherein said transparent plates include:

a pair of parallel spaced first side plates serving as side walls; and a pair of parallel spaced second side plates serving as side walls lying transversely to said first-mentioned side walls;

said first side plates having a plurality of spaced first engaging portions on inner surfaces thereof;

said second side plates having a plurality of spaced second engaging portions on inner surfaces thereof for engaging selected ones of said first engaging portions so that said second side plates can be spaced from each other by a variable distance.

9. A form according to claim 1, wherein said frame comprises:

a plurality of ultraviolet-permeable transparent plates jointly defining said space; and a ultraviolet-permeable transparent stiffener to be embedded in said resin mold.

10. A form according to claim 9, wherein said transparent stiffener is spaced a predetermined distance from one of said transparent plates, and has a projection inserted in an opening defined in said one of the transparent plates.

11. A form according to claim 1, wherein said frame comprises frame members integrally fixed to said resin mold which is produced when the ultraviolet-curable resin poured into the space is cured.

12. A form according to claim 11, wherein said frame member has a portion projecting into said space in generally complementary relation in shape to said master model.

13. A clamping jig for clamping a resin mold for receiving an ultraviolet-curable resin poured therein which is to be cured into a product by exposure to ultraviolet radiation, comprising:

ultraviolet-permeable first and second sandwiching plates adapted to be positioned on respective opposite surfaces of said resin mold;

a plurality of ultraviolet-permeable spacers disposed between confronting surfaces of said first and second sandwiching plates outward of said resin mold; and fastening means for integrally clamping said first and second sandwiching plates together through said spacers;

said first sandwiching plate having an opening for introducing said ultraviolet-curable resin therethrough into said resin mold.

14. A clamping jig according to claim 13, wherein said first and second sandwiching plates with said spacers interposed therebetween have respective inner surfaces spaced from each other by a distance which is smaller than a dimension of said resin mold to extend between said inner surfaces.

15. A clamping jig for clamping a resin mold for receiving an ultraviolet-curable resin poured therein which is to be cured into a product by exposure to ultraviolet radiation, comprising:

ultraviolet-permeable first and second cases adapted to be positioned on respective opposite surfaces of said resin mold and openable and closable with respect to each other; and fastening means for integrally clamping said first and second cases together with said resin mold housed therein;

said first case having an opening for introducing said ultraviolet-curable resin therethrough into said resin mold.

16. A clamping jig according to claim 15, wherein said first and second cases have respective inner surfaces for accommodating said resin mold therebetween, said inner surfaces spaced from each other by a distance which is smaller than a dimension of said resin mold to extend between said inner surfaces.

* * * * *